US 9,256,483 B2

(12) United States Patent
Choi et al.

(10) Patent No.: US 9,256,483 B2
(45) Date of Patent: Feb. 9, 2016

(54) MULTI-INPUT CONTROL METHOD AND SYSTEM, AND ELECTRONIC DEVICE SUPPORTING THE SAME

(71) Applicant: Samsung Electronics Co., Ltd., Suwon-si, Gyeonggi-do (KR)

(72) Inventors: Bokun Choi, Seoul (KR); Kidong Hong, Suwon-si (KR); Jeehye Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 14/201,003

(22) Filed: Mar. 7, 2014

(65) Prior Publication Data
US 2014/0259029 A1 Sep. 11, 2014

(30) Foreign Application Priority Data
Mar. 11, 2013 (KR) ........................ 10-2013-0025784

(51) Int. Cl.
*G06F 13/00* (2006.01)
*G06F 9/54* (2006.01)
*G06F 3/0488* (2013.01)
*G06F 3/0481* (2013.01)

(52) U.S. Cl.
CPC .............. *G06F 9/542* (2013.01); *G06F 3/0481* (2013.01); *G06F 3/0488* (2013.01); *G06F 3/04886* (2013.01)

(58) Field of Classification Search
CPC ..... G06F 9/4411; G06F 9/4443; G06F 9/542; G05B 19/054
USPC .................................. 719/318, 329; 710/8, 12
See application file for complete search history.

(56) References Cited

U.S. PATENT DOCUMENTS

| 7,116,310 | B1* | 10/2006 | Evans ................... G06F 3/0238 345/156 |
| 7,631,124 | B2* | 12/2009 | Lockhart ................ G06F 3/038 710/62 |
| 8,209,566 | B2* | 6/2012 | Lancaster ........... G06F 11/0739 714/2 |
| 2002/0180798 | A1 | 12/2002 | Poor et al. |
| 2006/0066571 | A1 | 3/2006 | Fairs et al. |
| 2006/0077183 | A1 | 4/2006 | Studt |
| 2009/0077467 | A1 | 3/2009 | Adappa et al. |
| 2009/0244016 | A1 | 10/2009 | Casparian et al. |
| 2009/0288132 | A1 | 11/2009 | Hegde |
| 2010/0169791 | A1 | 7/2010 | Pering et al. |
| 2010/0283735 | A1 | 11/2010 | Kim et al. |
| 2011/0179380 | A1* | 7/2011 | Shaffer ............... G06F 3/04883 715/781 |
| 2011/0271200 | A1 | 11/2011 | Kikkawa et al. |
| 2013/0009864 | A1 | 1/2013 | Jeong |

FOREIGN PATENT DOCUMENTS

| EP | 2 530 922 A1 | 12/2012 |
| JP | 2009-123032 A | 6/2009 |

(Continued)

*Primary Examiner* — Andy Ho
(74) *Attorney, Agent, or Firm* — Jefferson IP Law, LLP

(57) ABSTRACT

A multi-input control method and system, and an electronic device supporting the same are provided. The multi-input control method includes receiving an activation request for multiple applications (apps), identifying one or more input units to operate the multiple apps, and assigning the input units to the multiple apps according to occurrence of an event or preset information so that the input units are operable to operate the apps in an independent manner.

41 Claims, 13 Drawing Sheets

(56) References Cited

FOREIGN PATENT DOCUMENTS

| | | |
|---|---|---|
| JP | 2010-211802 A | 9/2010 |
| KR | 10-2003-0004876 A | 1/2003 |
| KR | 10-2009-0118837 A | 11/2009 |
| KR | 2010-0120958 A | 11/2010 |
| KR | 10-2011-0037064 A | 4/2011 |
| WO | 2009-154637 A1 | 12/2009 |
| WO | 2010-110613 A1 | 9/2010 |
| WO | 2012-041239 A1 | 4/2012 |

* cited by examiner

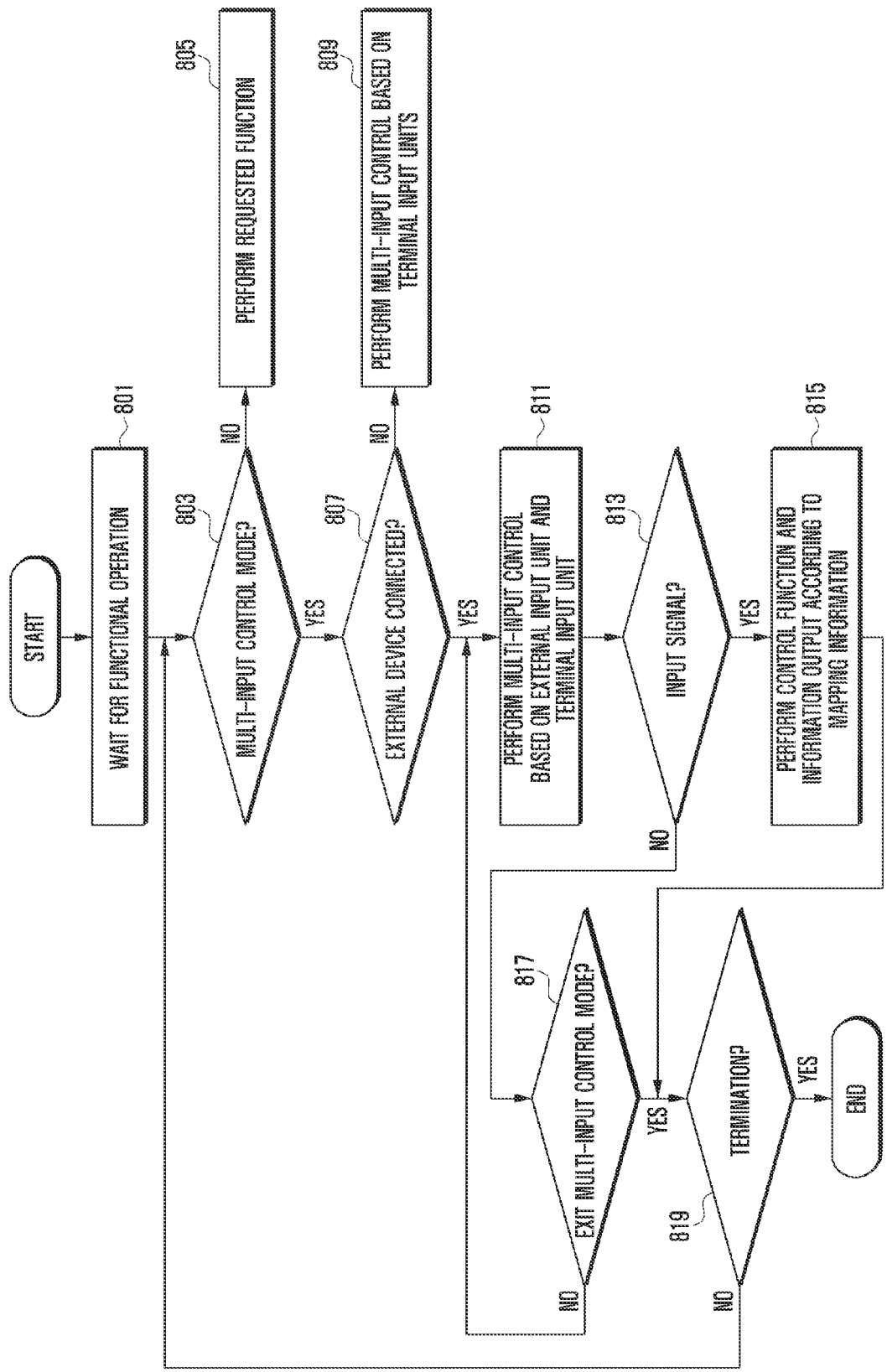

FIG. 9A
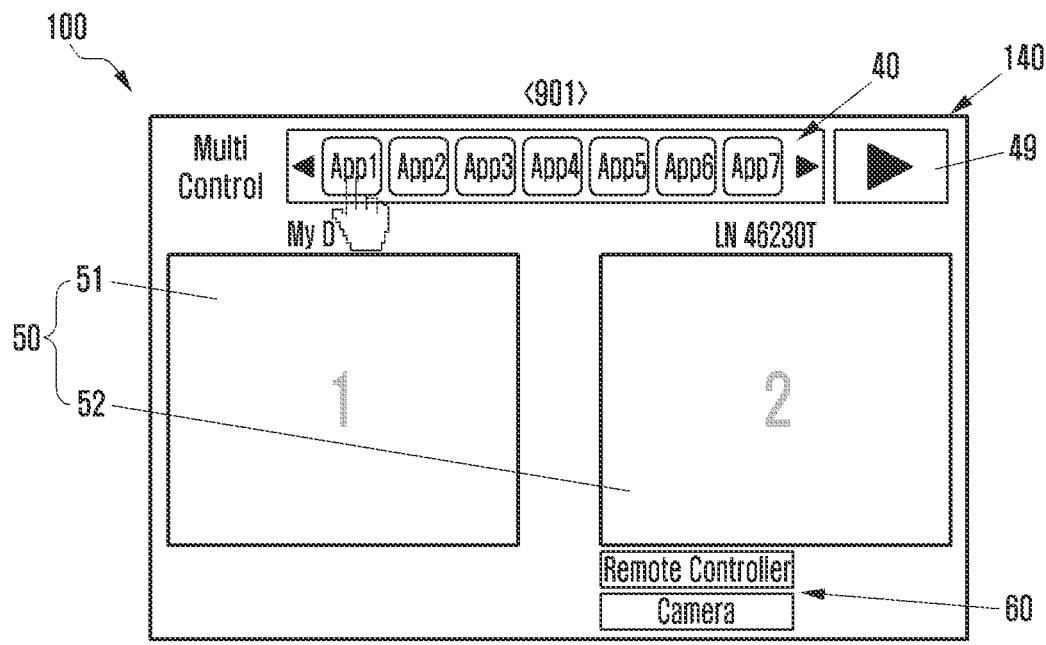
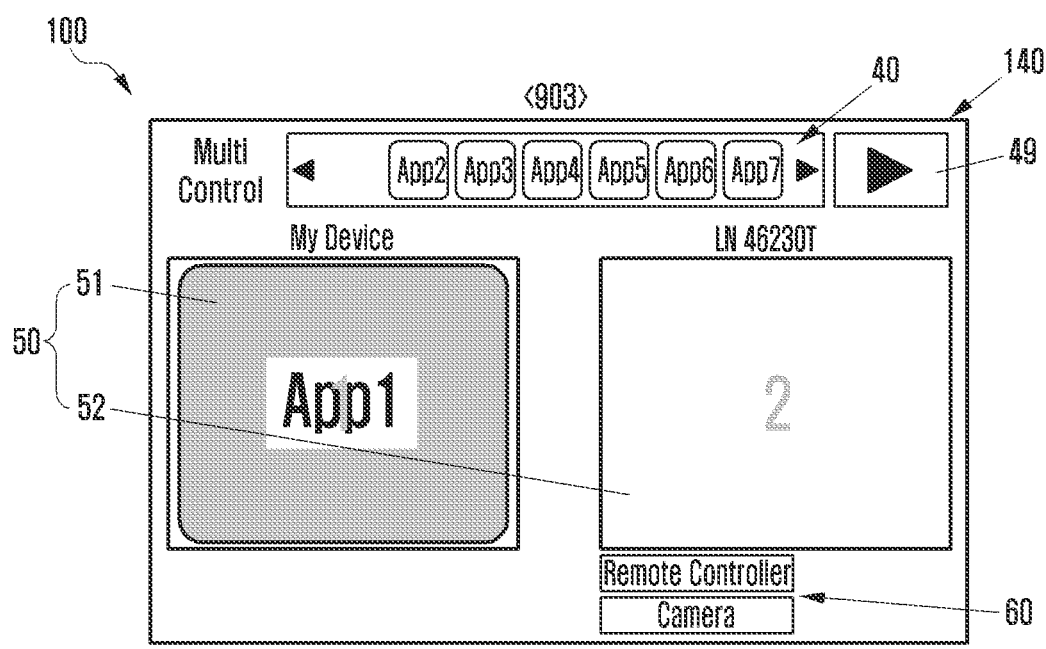

FIG. 9B
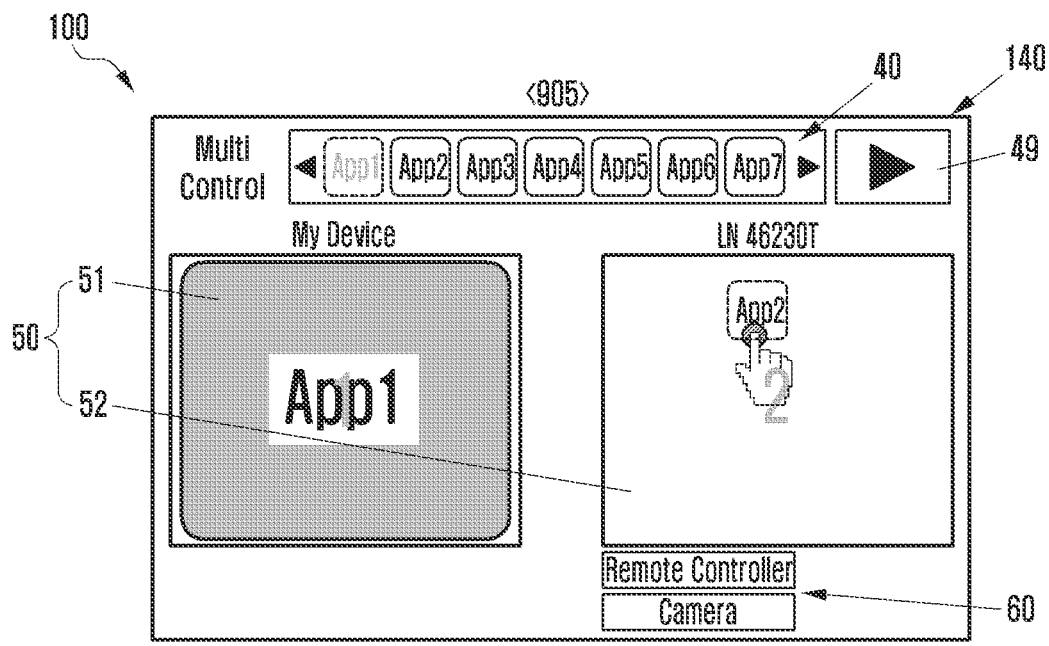
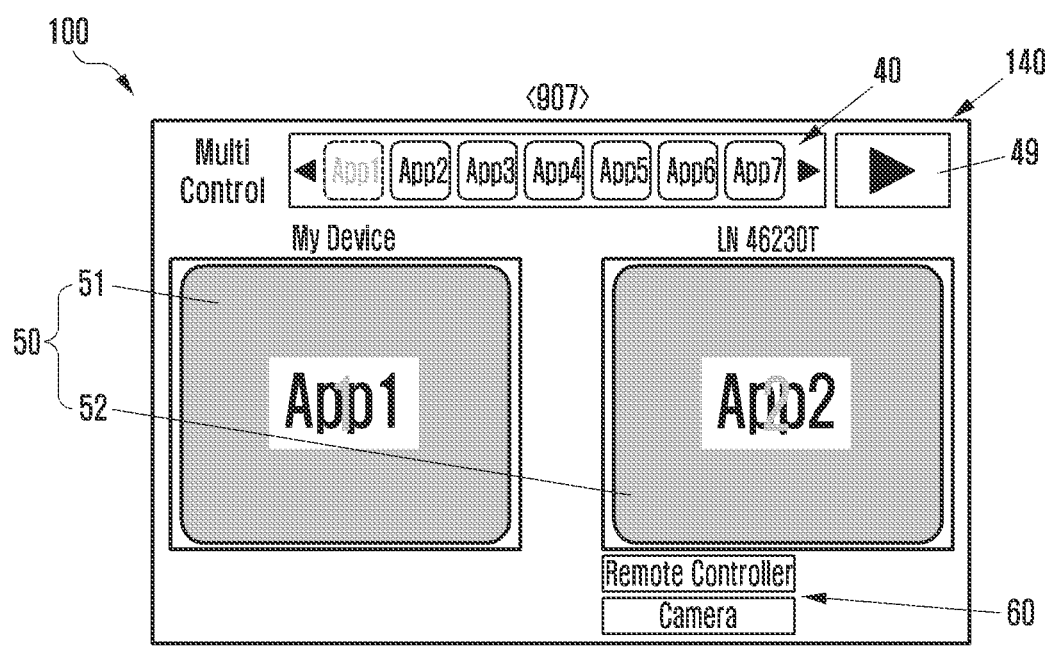

MULTI-INPUT CONTROL METHOD AND SYSTEM, AND ELECTRONIC DEVICE SUPPORTING THE SAME

CROSS-REFERENCE TO RELATED APPLICATION(S)

This application claims the benefit under 35 U.S.C. §119 (a) of a Korean patent application filed on Mar. 11, 2013, in the Korean Intellectual Property Office and assigned Serial number 10-2013-0025784, the entire disclosure of which is hereby incorporated by reference.

TECHNICAL FIELD

The present disclosure relates to manipulation of an electronic device. More particularly, the present disclosure relates to a multi-input control method and system, and electronic device supporting the same wherein a variety of functions are supported according to input control of the electronic device.

BACKGROUND

Recent advances in hardware technologies have enabled electronic devices such as mobile terminals to support various user functions in composite ways. Such electronic devices of the related art now support a multitasking feature.

An electronic device supporting a multitasking feature enables activation of multiple user functions. However, in most cases, only one user function is actually utilized according to user input control. That is, during execution of one application program, to execute another application program, the user of the electronic device may have to perform input control to suspend execution of the current application program and to newly select a different application program to be executed. Such input control for selecting an application program to be suspended and another application program to be executed in an existing multitasking environment may confuse and inconvenience the user, and may cause waste of user time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a multi-input control method and system, and electronic device supporting the same, wherein input control can be independently performed for different application programs (apps).

In accordance with an aspect of the present disclosure, a method for multi-input control in an electronic device is provided. The method includes receiving an activation request for multiple apps, identifying one or more input units to operate the multiple apps, and assigning the input units to the multiple apps according to occurrence of an event or preset information so that the input units are operable to operate the apps in an independent manner.

In accordance with another aspect of the present disclosure, an electronic device supporting multi-input control is provided. The electronic device includes one or more input units configured to generate input signals for operating multiple apps, and a control unit configured to perform, upon reception of an activation request for the apps, a process of assigning the input units to the multiple apps according to occurrence of an event or preset information so that the input units are operable to operate the apps in an independent manner.

In accordance with another aspect of the present disclosure, an electronic device supporting multi-input control is provided. The electronic device includes a connection interface to which one or more external input units generating input signals for operating multiple apps are connectable, and a control unit configured to perform, upon reception of an activation request for the apps, a process of assigning the external input units to the multiple apps according to occurrence of an event or preset information so that the external input units are operable to operate the apps in an independent manner.

In accordance with another aspect of the present disclosure, a multi-input control system is provided. The multi-input control system includes an electronic device capable of supporting execution of multiple apps and including one or more input units configured to operate the multiple apps, and at least one external input/output device connected with the electronic device through a connection interface of the electronic device and configured to receive an input signal from one or more external input units, wherein the electronic device is configured to assign one or more input units selected from among the input units thereof and the external input units to the multiple apps so that the assigned input units are operable to operate the apps in an independent manner, or to output an input unit list to enable such input unit assignment.

As described above, according to the multi-input control method and system of the present disclosure, at least one input unit may be assigned to one application program, so that user input control can be performed on a per application basis.

The present disclosure enables performance of input control on a per application basis, so that multiple application programs can be independently manipulated.

Hence, in the present disclosure, a particular application program can be directly controlled by manipulating a specific input unit without need of selecting one application program.

The present disclosure enables usage of external input units in a composite manner for connecting and manipulating one or more external output units, extending input control in various forms.

In the present disclosure, input control on a per application basis enables smooth utilization of various content stored in the electronic device through external output units without interference.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates a multi-input control method according to the second embodiment of the present disclosure;

FIGS. 9A and 9B are an example of a screen interface supporting multi-input control according to the second embodiment of the present disclosure;

Throughout the drawings, like reference numerals will be understood to refer to like parts, components, and structures

DETAILED DESCRIPTION

Figure 1:
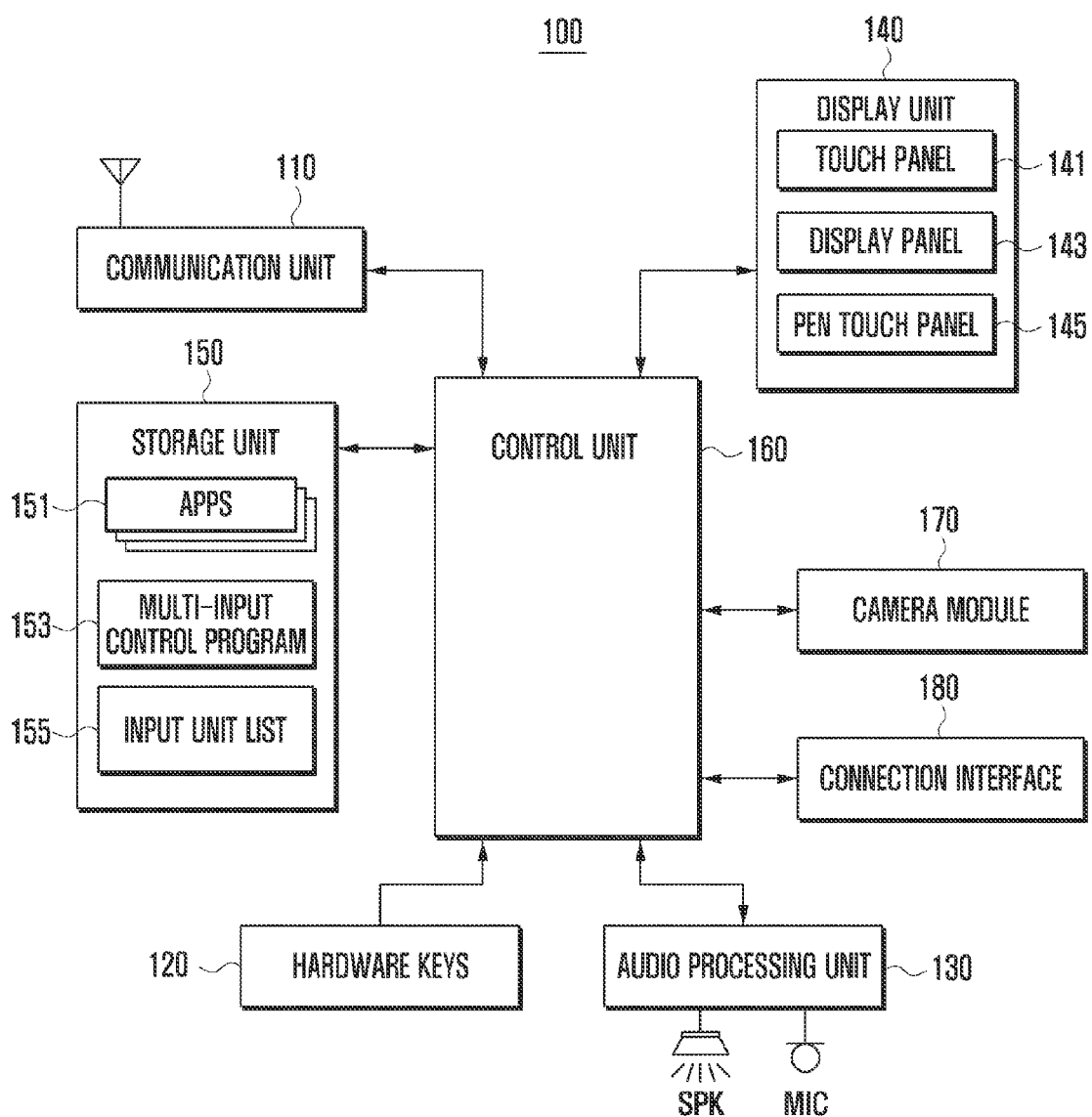
FIG. 1 is a block diagram of an electronic device supporting multi-input control according to a first embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of well-known functions and structures incorporated herein may be omitted to avoid obscuring the subject matter of the present disclosure. Detailed descriptions of components having substantially the same configurations and functions may also be omitted.

In the drawings, some elements are exaggerated or only outlined in brief, and thus may be not drawn to scale. The present disclosure is not limited by relative sizes of objects and intervals between objects in the drawings.

FIG. 1 is a block diagram of an electronic device (hereinafter, referred to as a mobile terminal) supporting multi-input control according to a first embodiment of the present disclosure.

Referring to FIG. 1, the mobile terminal 100 may include a communication unit 110, an audio processing unit 130, a display unit 140, a storage unit 150, and a control unit 160. The mobile terminal 100 may further include, as input means, hardware keys 120, a connection interface 180, a camera module 170, and a touch panel 141 and a pen touch panel 145 of the display unit 140. The mobile terminal 100 may further include motion sensors such as an acceleration sensor, proximity sensor and gyro sensor as input means (not shown).

Here, the camera module 170 is used for image capture for the mobile terminal 100. As an image signal captured by the camera module 170 may be used as input data for a specific function performed by the control unit 160, the camera module 170 may be regarded as an input means in the present disclosure. The connection interface 180 is an interface connectable to at least one of an external input unit and an external output unit. For example, external input units may include a keyboard, mouse, electronic pen connectable to the interface, and remote control. Hence, when an external input unit is connected to the connection interface 180, the connection interface 180 may be regarded as an input means.

As an external input/output device, a smart TeleVision (TV), smart monitor or the like may be connected to the connection interface 180. In this case, the connection interface 180 may perform not only an output function to output data from the mobile terminal 100 to an external input/output device but also an input function to transfer a user input signal received by the external input/output device to the control unit 160. Hence, the connection interface 180 may be described as an input means or an input/output means according to characteristics of an external unit or device connected thereto.

The pen touch panel 145 is configured to receive contact with or a gesture of an electronic pen as an input signal. Hence, the pen touch panel 145 and an electronic pen used therewith may be regarded as another input means in the present disclosure.

The mobile terminal 100 having the above configuration of the present disclosure supports a multi-input control function. That is, among many application programs (applications or apps) including apps stored in the storage unit 150 and server-based apps stored in external servers, the mobile terminal 100 supports manipulation of at least one activated app. Here, to support app manipulation, the mobile terminal 100 may map input units thereof with specific apps. In other words, the mobile terminal 100 may assign at least one input unit to a specific app according to the number of activated apps and a user selection. Hence, when multiple apps are used, the mobile terminal 100 may enable the user to manipulate a specific input unit to control input to an app mapped with the input unit.

The communication unit 110 is configured to support communication of the mobile terminal 100. The communication unit 110 may establish various communication channels to support message services, webpage browsing, video calls, voice calls, data transmission and reception, and cloud services. The mobile terminal 100 may store various apps supporting functions of the communication unit 110. The user may activate an app and utilize the function of the app. In particular, when multiple apps are used through the communication unit 110, the mobile terminal 100 may assign input units to the apps. For example, the communication unit 110 may be used to support browsing of multiple webpages.

Here, for browsing of multiple webpages, one independent input unit may be assigned to each webpage. For example, the touch panel 141 may be mapped as an input means to a first one of the webpages, and the pen touch panel 145 may be mapped as an input means to a second one of the webpages. A first region of at least one of the touch panel 141 and the pen touch panel 145 may be assigned as an input unit to a first one of the webpages, and a second region of at least one of the pen touch panel 145 and the pen touch panel 145 may be assigned as an input unit to a second one of the webpages. That is, the user may manipulate the touch panel 141 to browse the first webpage and manipulate an electronic pen to browse the second webpage.

As another example, when webpage browsing and instant messaging are performed through the communication unit 110, the touch panel 141 may be mapped as an input means to webpage browsing and the pen touch panel 145 may be mapped as an input means to instant messaging. When a webpage browsing function and a video call function are performed through the communication unit 110, the touch panel 141 and pen touch panel 145 may be mapped as an input means to the webpage browsing function and the hardware keys 120 may be mapped as an input means to the video call function.

The hardware keys 120 are configured to generate various input signals necessary for operation of the mobile terminal 100. The hardware keys 120 may include various forms of keys such as a button key, side key, and home key. When one app is activated, the hardware keys 120 may be used to manipulate the app. When multiple apps are activated, the hardware keys 120 may be used to manipulate a specific app under control of the control unit 160. The hardware keys 120 may also be used to manipulate an assigned app according to user selection. When the hardware keys 120 are assigned to a specific app, input signals generated by keystrokes of the hardware keys 120 may be applied only to the corresponding app. The hardware keys 120 may be reassigned to a different app according to user selection. When execution of an app to which the hardware keys 120 are assigned is ended, the hardware keys 120 may be assigned to a different app under control of the control unit 160 or may remain in a wait state for app assignment by the user. Input signals generated by keystrokes of the hardware keys 120 may carry input means IDentifier (ID) information indicating the hardware keys 120 and button class information indicating the pressed key. Hence, when an input signal generated by a keystroke of the hardware keys 120 is received, the control unit 160 may examine the input means ID information and button class information of the input signal to determine the app to which, and how, the input signal is applied. To this end, the control unit 160 may refer to information on a mapping between the hardware keys 120 and an app ID. The mapping between the hardware keys 120 and an app ID may be specified by default during app manipulation or according to user selection.

Meanwhile, the mobile terminal 100 may support association between the hardware keys 120 and apps. For example, the home key of the hardware keys 120 may be mapped as an input means to a first app and the side key of the hardware keys 120 may be mapped as an input means to a second app. To this end, the mobile terminal 100 may assign button IDs to the individual hardware keys 120. Using button ID information, the control unit 160 may determine the app to which, and how, an input signal caused by a keystroke is applied.

The audio processing unit 130 is configured to process various audio signals generated during operation. The audio processing unit 130 may include a speaker SPK to output an audio signal generated or decoded by the mobile terminal 100, and a microphone MIC to collect an audio signal for a voice call, video call or recording. The microphone MIC of the audio processing unit 130 may be regarded as an input means. That is, the microphone MIC may be used as an input unit to manipulate a specific app. For example, the microphone MIC may collect a voice signal and forward the voice signal to the control unit 160 as an input signal for a call function handling a video call or voice call.

The microphone MIC may also be used as an input unit to generate a command for an app running based on speech recognition. For example, the microphone MIC may be assigned as an input means to a first one of multiple webpages, and the touch panel 141 and pen touch panel 145 be assigned as an input means to a second one thereof. In this case, when a voice signal is collected, the mobile terminal 100 may generate a corresponding command through speech recognition and apply the command to manipulate the first webpage.

In addition, when an input means is assigned to an app, the audio processing unit 130 may output a corresponding sound notification. When a query about an input means assigned to a given app is received, the audio processing unit 130 may output a corresponding sound notification under control of the control unit 160. When a request for generation of an input signal is received from a specific input unit, the audio processing unit 130 may output a sound notification describing the input signal. For example, after an external input/output unit is connected to the connection interface 180, when an input signal is received for controlling an app through the external input/output unit, the audio processing unit 130 may output a sound notification describing the input signal. Output of such a sound notification may be skipped according to designer or user selection.

The display unit 140 is configured to output various functional screens needed for operation of the mobile terminal 100. For example, the display unit 140 may output a menu screen, an app handling screen, a multi-app handling screen, and one app handling screen in a full screen format among multiple apps in execution. In particular, the display unit 140 may output a screen for an app activated according to user selection. When manipulation of multiple apps is requested, the display unit 140 may output multiple app handling screens through a split screen feature. Here, to support multi-input control of the present disclosure, the display unit 140 may provide an input unit mapping screen. The input unit mapping screen may include an app selection area for selecting multiple apps, an app usage area for outputting screens of the selected apps, and an input unit selection area for selecting input units to be assigned to the selected apps. When at least one input unit is selected, the display unit 140 may output corresponding app handling screens, to which input signals from the input unit are applied, in a form of a multi-input control screen. Here, the multi-input control screen may be similar to the input unit mapping screen except for the input unit selection area. For example, the multi-input control screen may include an input unit mapping area instead of the input unit selection area. Various screen interfaces are described in more detail later with reference to the drawings.

To support an input feature, the display unit 140 may include a touch panel 141, a display panel 143, and a pen touch panel 145. The touch panel 141 may be a panel that senses a physical or electrical change caused by a touch with a finger or the like by using a capacitive or resistive technique. The touch panel 141 may be placed on or under the display panel 143 and send information regarding the position of a touch with a finger and the gesture corresponding to movement of the finger to the control unit 160. The display panel 143 is a panel on which screen composition elements are output. Various screen composition elements are output on the display unit 140 mapped with the touch panel 141. For example, as described before, the display unit 140 may output the input unit mapping screen and the multi-input control screen. The pen touch panel 145 may be placed on or under the display panel 143, and may recognize access of an electronic pen and provide information on movement of the electronic pen to the control unit 160. The pen touch panel 145 may be one of various types according to characteristics of the electronic pen. For example, the pen touch panel 145 may be an electromagnetic induction panel. The touch panel 141 and pen touch panel 145 may be regarded as an input means in the present disclosure. When at least one of a finger touch feature or a pen touch feature is not used in the multi-input control function of the present disclosure, the display unit 140 may be designed so as not to include at least one of the touch panel 141 or the pen touch panel 145.

In addition, when an input signal is generated by one of input units assigned respectively to multiple apps, the display unit 140 may output information indicating generation of the input signal. For example, when a first input signal is generated by a first input unit assigned to a first app, the display unit 140 may output a text popup indicating generation of the first input signal or information on a function executed according to the first input signal on the first app handling screen. When a second input signal is generated by a second input unit assigned to a second app, the display unit 140 may output text information indicating the type of the second input signal or a function executed according to the second input signal on the second app handling screen.

The storage unit 150 may store various application programs needed for operation of the mobile terminal 100 and various data generated during operation thereof. For example, the storage unit 150 may store an operating system or the like needed for operating the mobile terminal 100. In particular, the storage unit 150 stores a variety of apps related to user functions and provides an app and associated data to the control unit 160 for execution according to a user request. To this end, as shown, the storage unit 150 may store a plurality of apps 151, a multi-input control program 153, and an input unit list 155.

The apps 151 are application programs supporting various functions of the mobile terminal 100. The apps 151 may be represented as icons or menu items on the display unit 140 or may be mapped with shortcut keys, and may be activated according to user requests or information. For example, the apps 151 may include a voice call app, a video call app, a cloud service app, a camera app, a web access app, and the like. The apps 151 may include multiple apps having similar functions. For example, the apps 151 may include multiple browser apps. The apps 151 may also include multiple apps related to the camera module 170. The apps 151 may include multiple apps for utilizing external input/output units. The apps 151 may include an app for multi-input control of the present disclosure. Hence, when multiple apps are activated, the mobile terminal 100 may invoke and activate the multi-input control app to configure settings for selection of input units or to support independent utilization of default input units.

The multi-input control program 153 is a program that supports assignment of at least one input unit to at least one app used in the mobile terminal 100. The multi-input control program 153 may include a routine for identifying an app to be activated upon request, a routine for identifying input units available for utilizing the app, a routine for setting a multi-input control mode, and a routine for selecting at least one input unit to be assigned to the app during the multi-input control mode. The multi-input control program 153 may include a routine for assigning, when one app is activated during the multi-input control mode, all available input units to the app. The multi-input control program 153 may include a routine for invoking the input unit list 155 when multiple apps are activated during the multi-input control mode, and a routine for assigning input units selected by default or the user to the activated apps.

The input unit list 155 contains information on input units available for utilization of a specific app. For example, the input unit list 155 may include the touch panel 141, pen touch panel 145 and hardware keys 120 as input means for a message handling app. The input unit list 155 may further include a keyboard, mouse, touch panel, pen and pen touch panel, which may be connectable through the connection interface 180, as input means for the message handling app. To this end, the mobile terminal 100 may identify an external appliance connected to the connection interface 180 and add the identified external appliance to the input unit list 155. When an external input/output means is connected through the connection interface 180, the mobile terminal 100 may add an input part of the external input/output means to the input unit list 155.

When activation of an app is detected, the mobile terminal 100 may update the input unit list 155 by adding all input units available to the app as entries thereof. In the event that multiple apps are utilized, when a first input unit is assigned to a first app, the first input unit may be excluded from entries associated with a second app in the input unit list 155. In the case of an input unit capable of independent input control through region partitioning such as the touch panel 141 or pen touch panel 145, although the input unit is already assigned to a first app, the input unit may also be added as an entry for a second app in the input unit list 155. Presentation of the input unit list 155 is described in more detail later with reference to the accompanying screen representations.

The camera module 170 is configured to capture images for the mobile terminal 100. As the camera module 170 collects an image signal and provides the same to the control unit 160, it may be regarded as an input means for the mobile terminal 100. An image captured by the camera module 170 may be used as a command through image recognition. For example, the camera module 170 may capture an image of the face or hand of the user, and the control unit 160 may analyze the captured image by comparing the same with preset patterns and regard the image as an input for a command. Hence, the camera module 170 may be regarded as an input means for the present disclosure. That is, the camera module 170 may be available as an input unit and may be assigned to a specific app.

The connection interface 180 is used to connect external input/output units to the mobile terminal 100 for communication. The connection interface 180 may support both wired and wireless connections. For example, the connection interface 180 may support wired serial interfaces such as a Universal Serial Bus (USB) interface and Universal Asynchronous Receiver/Transmitter (UART) interface. The connection interface 180 may also support wireless interfaces such as a BLUETOOTH interface, ZigBee interface, Ultra-WideBand (UWB) interface, Radio Frequency IDentification (RFID) interface, infrared interface, and Wireless Application Protocol (WAP) interface. That is, the connection interface 180 may support various types of communication interfaces compatible with the mobile terminal 100. To connect one or more external input/output units, the connection interface 180 may be composed of multiple ports and wireless communication modules. For example, the connection interface 180 may support connection with a keyboard, mouse, wireless remote control, smart TV, smart monitor, tablet computer, personal computer, laptop computer, or the like. In support of multi-input control, the connection interface 180 enables external input units to also act as an input means of the present disclosure.

The control unit 160 performs various signal and data processing operations for the mobile terminal 100 of the present disclosure. For example, in response to an activation request for an app, the control unit 160 may execute the app and output a corresponding app handling screen on the display unit 140. Here, the control unit 160 may assign a default or selected input unit to the app according to preset information or a user request. In particular, when multiple apps are activated, the control unit 160 allows input units assigned to the apps to operate independently. To this end, the control unit 160 may have a configuration as shown in FIG. 2.

Figure 2:
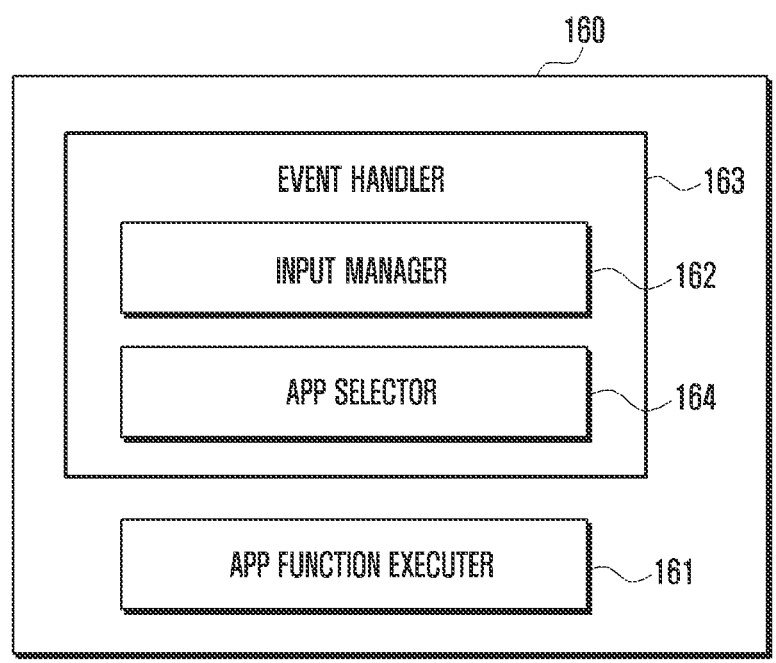
FIG. 2 illustrates a configuration of a control unit in the electronic device of FIG. 1 according to an embodiment of the present disclosure.

FIG. 2 illustrates a configuration of the control unit 160 according to an embodiment of the present disclosure.

Referring to FIG. 2, the control unit 160 may include an event handler 163 and an app function executer 161.

The app function executer 161 supports app utilization by loading, upon reception of an activation request for an app, program routines for the app and providing data needed for loading and executing the program routines. In particular, the app function executer 161 may apply an input signal provided by the event handler 163 to a specific app and output corresponding application results to the display unit 140 or the audio processing unit 130. Here, the app function executer 161 may examine the input means ID of the input signal provided by the event handler 163 to identify the input unit mapped with the app. To this end, the app function executer 161 may generate and maintain information regarding mappings between input means IDs and app IDs. The app function executer 161 may apply a received input signal to a corresponding app through analysis of input means ID and app ID. For an input unit subject to partial assignment such as the touch panel 141 or pen touch panel 145, the app function executer 161 may maintain information regarding input means ID, area demarcation, and app ID. Hence, when an input signal is received from the touch panel 141 or the like, the app function executer 161 may examine the input means ID and area demarcation information of the input signal to identify the corresponding app ID.

The event handler 163 supports classification of various input units available in the mobile terminal 100 and assignment thereof to apps, and distribution of input signals generated by input units. To this end, the event handler 163 may include an input manager 162 and an app selector 164.

The input manager 162 supports generation and update of the input unit list 155. The input manager 162 may provide an input unit mapping screen to assign input units to apps on the basis of the input unit list 155. More specifically, upon reception of an activation request for at least one app, the input manager 162 may provide an app module mapping screen enabling selection of an input unit to be assigned to the app. Here, the input manager 162 may generate the input unit list 155 or refer to the input unit list 155 stored in the storage unit 150. Each app may include design information regarding input units usable for execution. For an app, the input manager 162 may generate input unit mapping information indicating input units actually usable for the app by comparing information on input units usable for execution provided by the app with information on currently available input units in the mobile terminal 100. The input unit mapping information may be generated and updated on an app basis. Additionally, when an external input unit connected through the connection interface 180 is usable for an app in execution, the input manager 162 may perform information update by adding the external input unit as an entry to the input unit list 155. Then, when the external input unit is selected for utilization of the app, the input manager 162 may update the input unit mapping information accordingly.

In addition, the input manager 162 may assign an input unit to a specific app according to user selection or information set by default in the absence of user selection. During usage of a first app, when a second app is newly activated, the input manager 162 may adjust input units assigned to the first app. For example, after first and second input units have been assigned to the first app, when a request for assigning the second input unit to a second app is received, the input manager 162 may perform assignment adjustment so that only the first input unit is assigned to the first app. As another example, after first and second input units have been assigned to the first app, when a request for assigning the first input unit to a second app is received, the input manager 162 may perform assignment adjustment so that a first area of the first input unit is assigned to the first app, and generate input unit mapping information for the second app so that a second area (independent of the first area) of the first input unit is assigned to the second app. Thereafter, the input manager 162 sends an input signal generated by an input unit to the app selector 164.

The app selector 164 supports processing of an input signal with reference to the input unit mapping information generated by the input manager 162. That is, when an input signal is received, the app selector 164 may examine the input unit mapping information to identify an app mapped with the input unit having sent the input signal, and make a request to the app function executer 161 to apply the input signal to the identified app. Here, the app selector 164 may provide a multi-input control screen. The multi-input control screen may support processing of input signals for manipulating at least one app. When multiple app handling screens are output, the multi-input control screen may be used to output information indicating an app to which an input signal generated by a particular input unit is applied. The app selector 164 may provide information regarding the type of an input signal generated by a particular input unit and application of the input signal through the multi-input control screen. Output of information on an input signal may be skipped according to user or designer settings. The app selector 164 may support output of guide information on input units assigned to an app in a region close to the app.

As described above, the mobile terminal 100 supporting the multi-input control function of the present disclosure may provide information regarding input units available for at least one activated app, enabling utilization of a desired input unit. Particularly, when multiple apps are activated, the mobile terminal 100 may assign individual input units to the apps so that execution of the apps may be controlled separately according to manipulation of the input units. In addition, the mobile terminal 100 enables external input/output units connected through the connection interface 180 to be used as an independent input means in a more intuitive manner.

Figure 3:
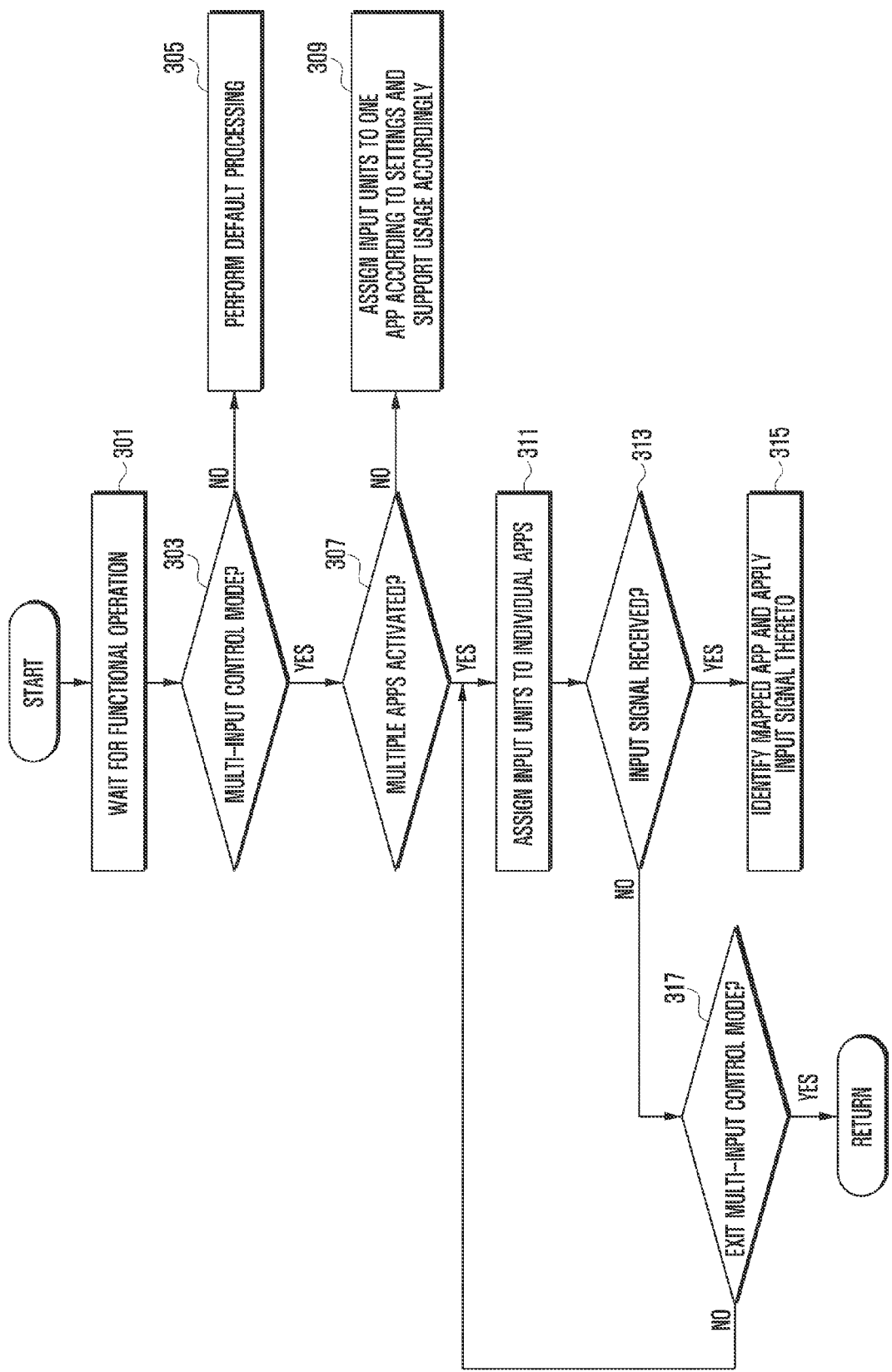
FIG. 3 illustrates a multi-input control method according to the first embodiment of the present disclosure.

FIG. 3 is a flowchart of a multi-input control method according to a first embodiment of the present disclosure.

Referring to FIG. 3, in the multi-input control method, at operation 301, the control unit 160 of the mobile terminal 100 waits for functional operation. Here, the control unit 160 may distribute power from a power source, output a standby screen, and remain in a sleep state. Thereafter, at operation 303, the control unit 160 checks whether the multi-input control mode is configured. If the multi-input control mode is not configured, the control unit 160 proceeds to operation 305 at which the control unit 160 supports default operation processing. That is, upon reception of an activation request for a specific app, the control unit 160 may assign input units of the mobile terminal 100 to the app and execute the app according to an input signal generated from the input units.

If the multi-input control mode is configured at operation 303, the control unit 160 proceeds to operation 307 at which the control unit 160 checks whether multiple apps are activated. If only one app is activated, the control unit 160 proceeds to operation 309 at which the control unit 160 assigns input units to the app according to settings and executes the app. Here, the control unit 160 may enable the user to select at least one input unit to be used for manipulation of the app.

If multiple apps are activated at operation 307, the control unit 160 proceeds to operation 311 at which the control unit 160 performs input unit assignment on an individual app basis. Here, the control unit 160 may assign multiple input units to the multiple apps according to preset information. For example, the control unit 160 may assign the touch panel 141 as an input means to the first app by default. The control unit 160 may assign the pen touch panel 145 as an input means to the second app by default. Alternatively, the control unit 160 may provide an input unit mapping screen for input unit assignment on an app basis and assign input units to the individual apps according to user selection. The control unit 160 may output information on mappings between input units and apps on the display unit 140 for user confirmation. The control unit 160 may generate and maintain input unit mapping information describing mappings between input means IDs and app IDs.

Thereafter, at operation 313, the control unit 160 checks whether an input signal is received from an input unit assigned to one app. If an input signal is received from an input unit assigned to one app, the control unit 160 proceeds to operation 315 at which the control unit 160 identifies the app mapped with the input unit having sent the input signal and applies the input signal to the identified app. To this end, an input unit generates an input signal having an input means ID. The control unit 160 may examine the input means ID of an input signal, identify the app ID mapped with the input means ID with reference to the input unit mapping information, and apply the input signal to the corresponding app.

If an input signal is not received from an input unit, the control unit 160 proceeds to operation 317 at which the control unit 160 checks whether an event for exiting the multi-input control mode is generated. If an event for exiting the multi-input control mode is generated, the control unit 160 returns to operation 305 at which the control unit 160 supports default operation processing. If an event for exiting the multi-input control mode is not generated, the control unit 160 returns to operation 311 and repeats the above procedure. During repetition from operation 311, the control unit 160 may change assignment of input units for a specific app according to a user request. When a new external input unit is connected to the mobile terminal 100, the control unit 160 may output an input unit mapping screen for assigning the external input unit to a desired app. The control unit 160 may then allow the external input unit to be used to manipulate the app according to user selection. In this process, the control unit 160 may update and manage the input unit mapping information. When an app to which the external input unit is to be assigned is not selected by the user, the control unit 160 may assign the external input unit to an app according to settings or automatically assign the external input unit to an app designed to support the same, and support manipulation of the app by use of the external input unit. Alternatively, when a new external input unit is connected, the control unit 160 may enter a state waiting for user selection as to assignment of the external input unit.

Figure 4:
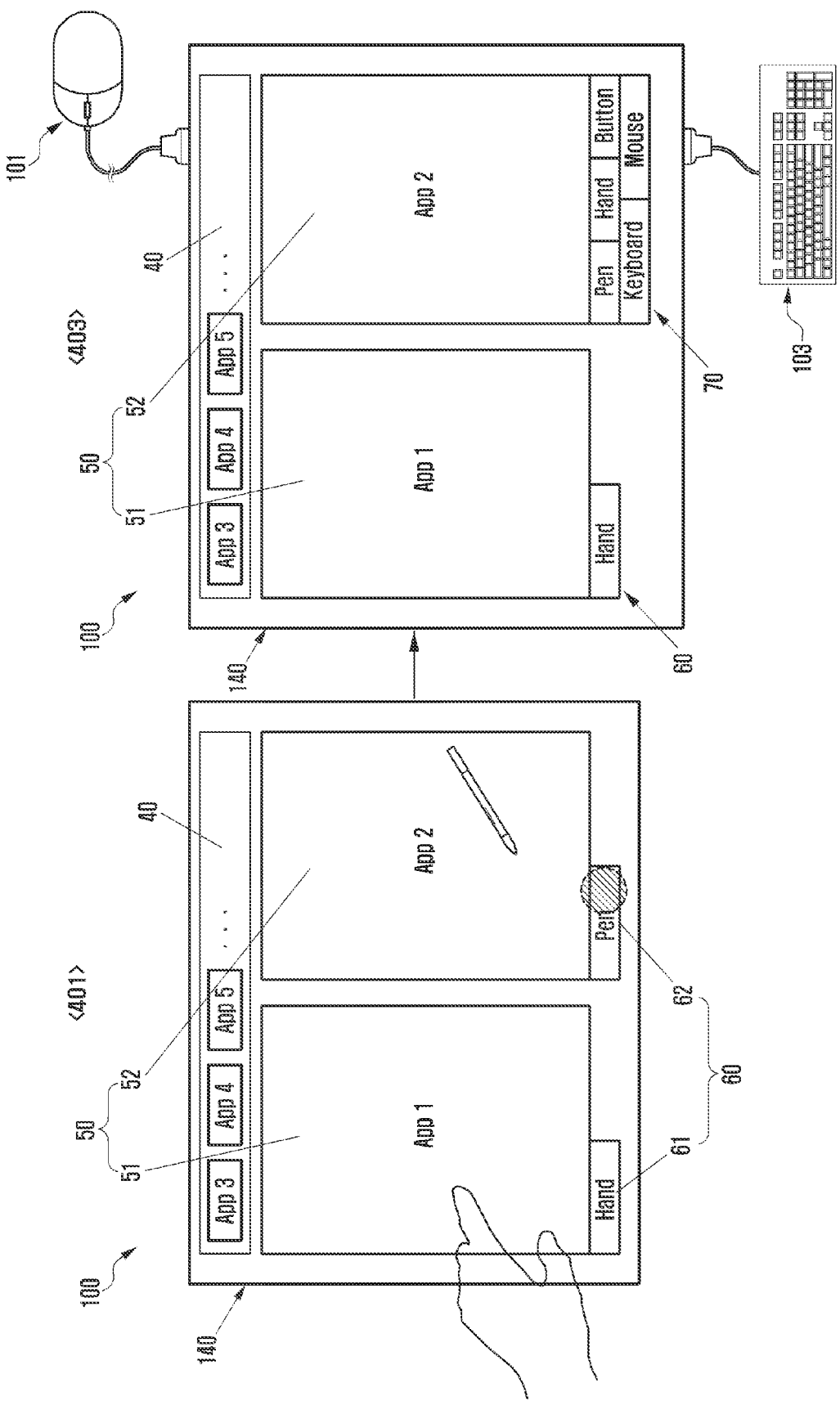
FIG. 4 is an example of a screen interface supporting multi-input control according to the first embodiment of the present disclosure.

FIG. 4 is an example screen interface of a mobile terminal supporting multi-input control according to the first embodiment of the present disclosure.

Referring to FIG. 4, the mobile terminal 100 may output a multi-input control screen on the display unit 140. As indicated by reference 401, the multi-input control screen illustrates a state wherein multiple apps are activated. The multi-input control screen may include an app selection area 40, an app usage area 50, and an input unit mapping area 60. The app selection area 40 is used to select at least one of a plurality of apps provided by the mobile terminal 100. As shown, multiple apps are listed as icons in the app selection area 40. The app selection area 40 may support a scrolling function to show currently hidden apps. The app selection area 40 may support a secondary window to show icons of currently hidden apps.

The app usage area 50 may include a first app usage area 51 and a second app usage area 52 to accommodate screens of, for example, a first app (App1) and a second app (App2). When an app icon arranged in the app selection area 40 is dragged to a portion of the app usage area 50, the corresponding app may be activated and a screen of the app may be output in the app usage area 50. Although two apps are activated in the state indicated by reference 401, the present disclosure is not limited thereto. That is, when more than two apps are activated, an increased number of app regions may be allocated in the app usage area 50.

The input unit mapping area 60 is used to provide information on input units assigned to apps in the app usage area 50. For example, the input unit mapping area 60 may include a first input unit mapping area 61 related to the first app usage area 51, and a second input unit mapping area 62 related to the second app usage area 52. Here, the first input unit mapping area 61 indicates a state wherein the touch panel 141 labeled as "Hand" is assigned as an input means to the first app (App1). The second input unit mapping area 62 indicates a state wherein the pen touch panel 145 labeled as "Pen" is assigned as an input means to the second app (App2).

In this case, when the user generates an input signal with a finger on the display unit 140, the mobile terminal 100 may apply the hand touch input signal only to the first app (App1). When the user generates an input signal with an electronic pen on the display unit 140, the mobile terminal 100 may apply the pen touch input signal only to the second app (App2). Even when a hand touch and a pen touch occur together, the mobile terminal 100 may apply the touches separately to the first app (App1) and the second app (App2).

To change input units, the user may select the input unit mapping area 60 to choose different input units. For example, when the second input unit mapping area 62 of the input unit mapping area 60 is selected, the mobile terminal 100 may output an input unit mapping screen as indicated by reference 403. The input unit mapping screen may include an app selection area 40, an app usage area 50, and an input unit selection area 70. Here, the app selection area 40 and the app usage area 50 may be the same as in the state indicated by indicia 401. As shown, the input unit selection area 70 is used to list input units available for manipulation of the second app (App2). The mobile terminal 100 may also list external input units connected to the connection interface 180. In the state indicated by indicia 403, a mouse 101 and a keyboard 103 are assumed to be connected as external input units to the connection interface 180.

Hence, in the input unit selection area 70, "Pen" indicating the pen touch panel 145, "Hand" indicating the touch panel 141, "Button" indicating the hardware keys 120, "Mouse" indicating the mouse 101 as an external input unit, and "Keyboard" indicating the keyboard 103 as an external input unit may be listed as selection items. The user may select multiple input units by selecting more than one of the device items listed in the input unit selection area 70. Then, mapping information of multiple input units may be output in the input unit mapping area.

In the input unit mapping screen indicated by indicia 403, the first input unit mapping area 61 may remain in the same state as in the multi-input control screen, and the second input unit mapping area 62 may be changed into the input unit selection area 70 related to the second app (App2).

Figure 5:
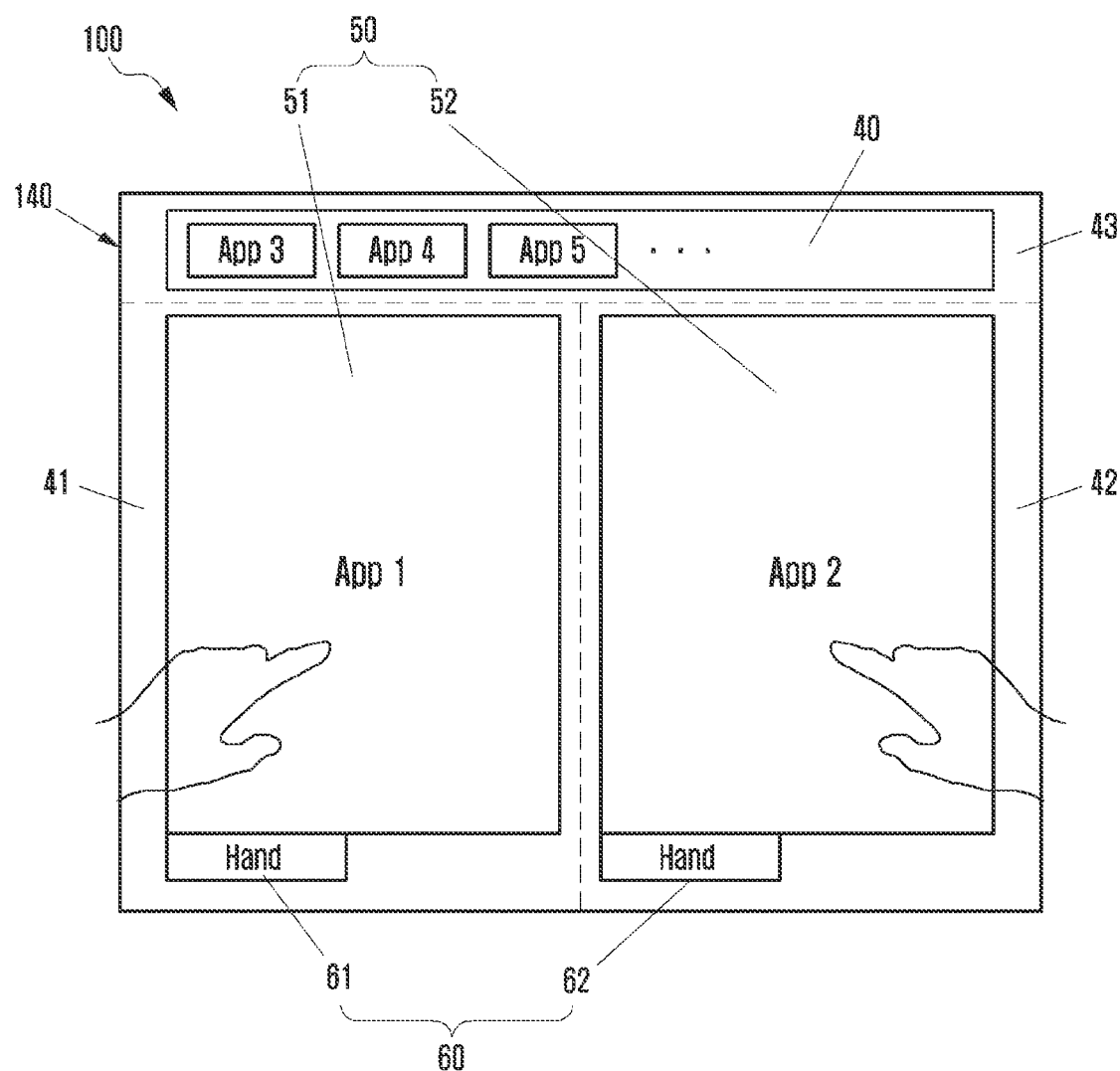
FIG. 5 is another example of a screen interface supporting multi-input control according to the first embodiment of the present disclosure.

FIG. 5 is another example screen interface of a mobile terminal supporting multi-input control according to the first embodiment of the present disclosure.

Referring to FIG. 5, the mobile terminal 100 may output a multi-input control screen having an input unit mapping area 60 labeled as "Hand" indicating the same input means on the display unit 140. As described before in FIG. 4, the multi-input control screen may include an app selection area 40, an app usage area 50, and an input unit mapping area 60. Here, as the app selection area 40 and the app usage area 50 are substantially identical to those described in connection with FIG. 4, a detailed description thereof is omitted.

In the input unit mapping area 60, "Hand" is output in both the first input unit mapping area 61 related to the first app (App1) and the second input unit mapping area 62 related to the second app (App2). That is, FIG. 5 indicates that the touch panel 141 is assigned as an input means to both the first app (App1) and the second app (App2). To independently support the first app (App1) and second app (App2) with the touch panel 141 serving as an input means, areas are demarcated on the touch panel 141 as shown. In FIG. 5, area demarcation is represented by dotted lines, but such dotted lines may be omitted or replaced with other indications such as solid lines in actual implementation.

In the case of area demarcation using dotted lines or solid lines, the mobile terminal 100 may represent an input means for the first app (App1) as a first touch panel area 41 and represent an input means for the second app (App2) as a second touch panel area 42 in a readily recognizable manner. The mobile terminal 100 applies a hand touch input signal generated in the first touch panel area 41 to the first app (App1) and applies a hand touch input signal generated in the second touch panel area 42 to the second app (App2). The app selection area 40 of the touch panel 141 of display unit 140 may be represented as a touch panel common area 43. The control unit 160 may regard the touch panel common area 43, the first touch panel area 41 and the second touch panel area 42 as independent touch areas. A touch signal generated from each area may be applied to an app mapped with the area. Here, a touch signal generated from touch panel common area 43 may be applied to the first touch panel area 41 or to the second touch panel area 42. For example, when an icon associated with a third app (App3) arranged in the app selection area 40 is dragged and placed on the first app usage area 51, the first app (App1) may be terminated and a screen of the third app (App3) may be output on the first app usage area 51. Alternatively, a specific app handled on the first app usage area 51 may be moved to the second app usage area 52 according to user control. For example, when the first app (App1) on the first app usage area 51 is selected and moved to the second app usage area 52, the first app (App1) may be output on the second app usage area 52.

Figure 6:
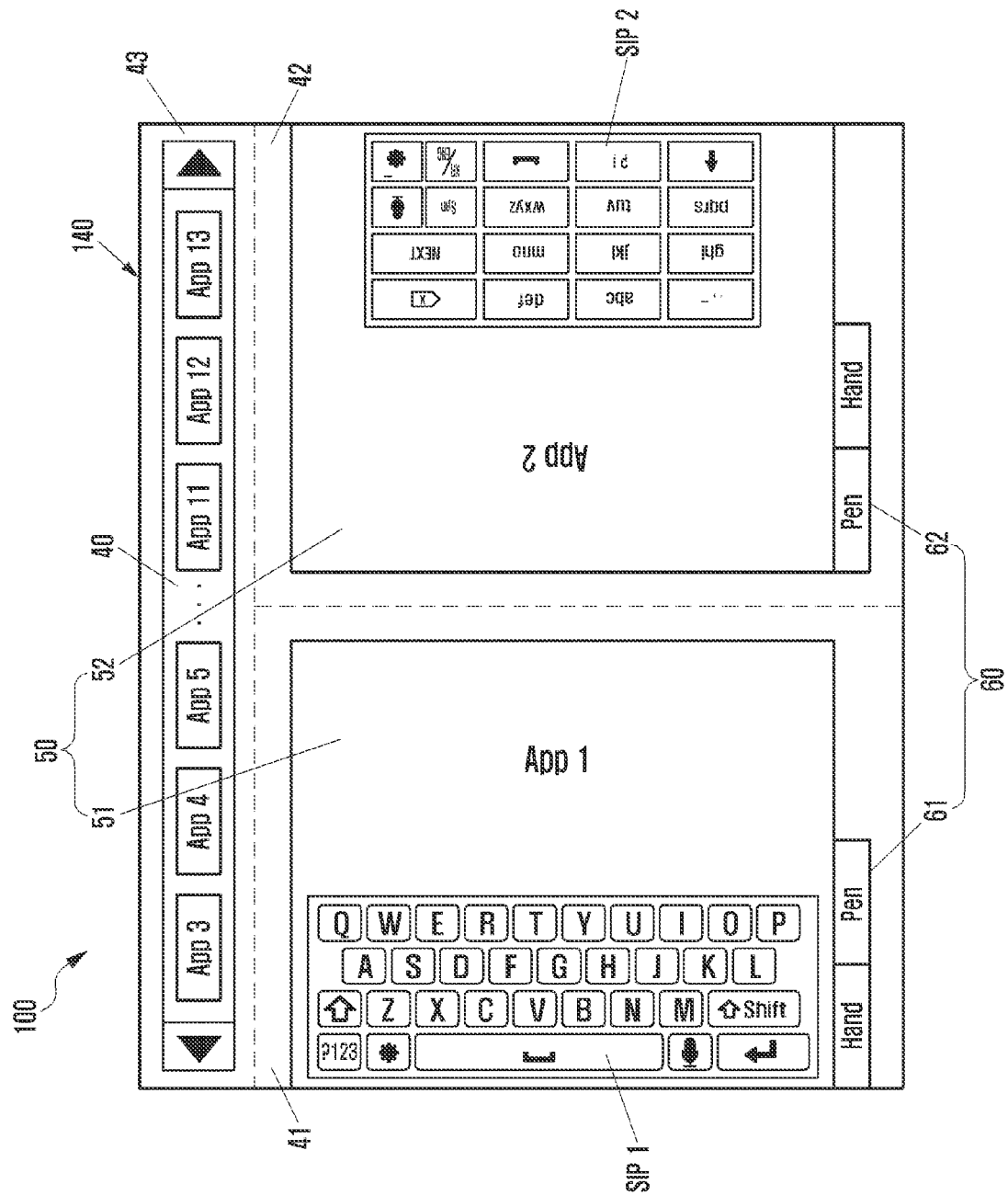
FIG. 6 is still another example of a screen interface supporting multi-input control according to the first embodiment of the present disclosure.

FIG. 6 is another example screen interface of a mobile terminal supporting multi-input control according to the first embodiment of the present disclosure.

Referring to FIG. 6, the mobile terminal 100 may output a screen including an app selection area 40, a first app usage area 51 and a second app usage area 52 on the display unit 140.

The app selection area 40 is used to select at least one of many apps. The app selection area 40 is used in a manner substantially identical to that described in FIG. 4 and FIG. 5.

The first app usage area 51 is used to output a screen of a first app (App1) as shown. In particular, the first app (App1) may require character input. For example, the first app (App1) may correspond to a webpage browsing function, a message handling function, or a document editing function. The screen output direction of the first app (App1) on the first app usage area 51 may be changed according to a user request. For example, when the user makes a gesture in a particular direction on the first app usage area 51, the mobile terminal 100 may change the screen output direction of the first app (App1) according to the gesture direction. When an event requesting text input is generated during utilization of the first app (App1) on the first app usage area 51, a first virtual input window (SIP1) may be output at a portion of the screen. In particular, the first virtual input window (SIP1) may be output in a direction aligned with the screen output direction of the first app (App1).

The second app usage area 52 is used to output a screen of a second app (App2) as shown. The second app (App2) may also require character input. For example, the second app (App2) may correspond to a chat function, a webpage browsing function, a scheduling function, or a photo editing function. As shown, the screen output direction of the second app (App2) may be of a different orientation to that of the screen output direction of the first app (App1). The screen output direction of the second app (App2) may also be identical to the screen output direction of the first app (App1) according to user settings. The screen output direction of the second app (App2) on the second app usage area 52 may also be adjusted according to a user request. For example, when a touch signal is generated by a clockwise touch gesture on the second app usage area 52, the second app screen may be rotated by 90 degrees clockwise. When a touch signal is generated by a counterclockwise touch gesture on the second app usage area 52, the second app screen may be rotated by 90 degrees counterclockwise. When an event requesting text input is generated during utilization of the second app (App2), a second virtual input window (SIP2) may be output at a portion of the second app usage area 52. In particular, the second virtual input window (SIP2) may be output in a direction aligned with the screen output direction of the second app (App2). In the above description, the first virtual input window (SIP1) and the second virtual input window (SIP2) are depicted as having key maps with different key layouts. However, the present disclosure is not limited thereto. That is, the first virtual input window (SIP1) and the second virtual input window (SIP2) may have the same key map, such as a virtual QWERTY keypad.

In FIG. 6, the mobile terminal 100 may use the first touch panel area 41 to independently manipulate the first app (App1) on the first app usage area 51. The mobile terminal 100 may also use the second touch panel area 42 to independently manipulate the second app (App2) on the second app usage area 52. The mobile terminal 100 may use the touch panel common area 43 to allow the app selection area 40 to be independently manipulated. A touch signal generated from each area may be applied to an app mapped with the area.

Area demarcation on the touch panel 141 of display unit 140 has been described above. However, the present disclosure is not limited thereto. That is, similarly to the touch panel 141, the pen touch panel 145 may be demarcated into a first app usage area 51, a second app usage area 52 and a touch panel common area 43. To present input unit mapping information, a first input unit mapping area 61 is provided at a region of the first app usage area 51, and a second input unit mapping area 62 is provided at a region of the second app usage area 52. Information on input units mapped with the app usage areas is output in the first input unit mapping area 61 and second input unit mapping area 62. In the drawing, "Hand" and "Pen" are listed in both the first input unit mapping area 61 and the second input unit mapping area 62, which indicates that different regions of the touch panel 141 are associated respectively with the first app usage area 51 and the second app usage area 52 and different regions of the pen touch panel 145 are associated respectively with the first app usage area 51 and the second app usage area 52 (region partitioning). Here, assume that the pen touch panel 145 is associated only with the second app usage area 52. Then, only "Pen" will be listed in the second input unit mapping area 62 and a hand touch signal generated on the second app usage area 52 will be applied to an app running on the first app usage area 51.

Figure 7:
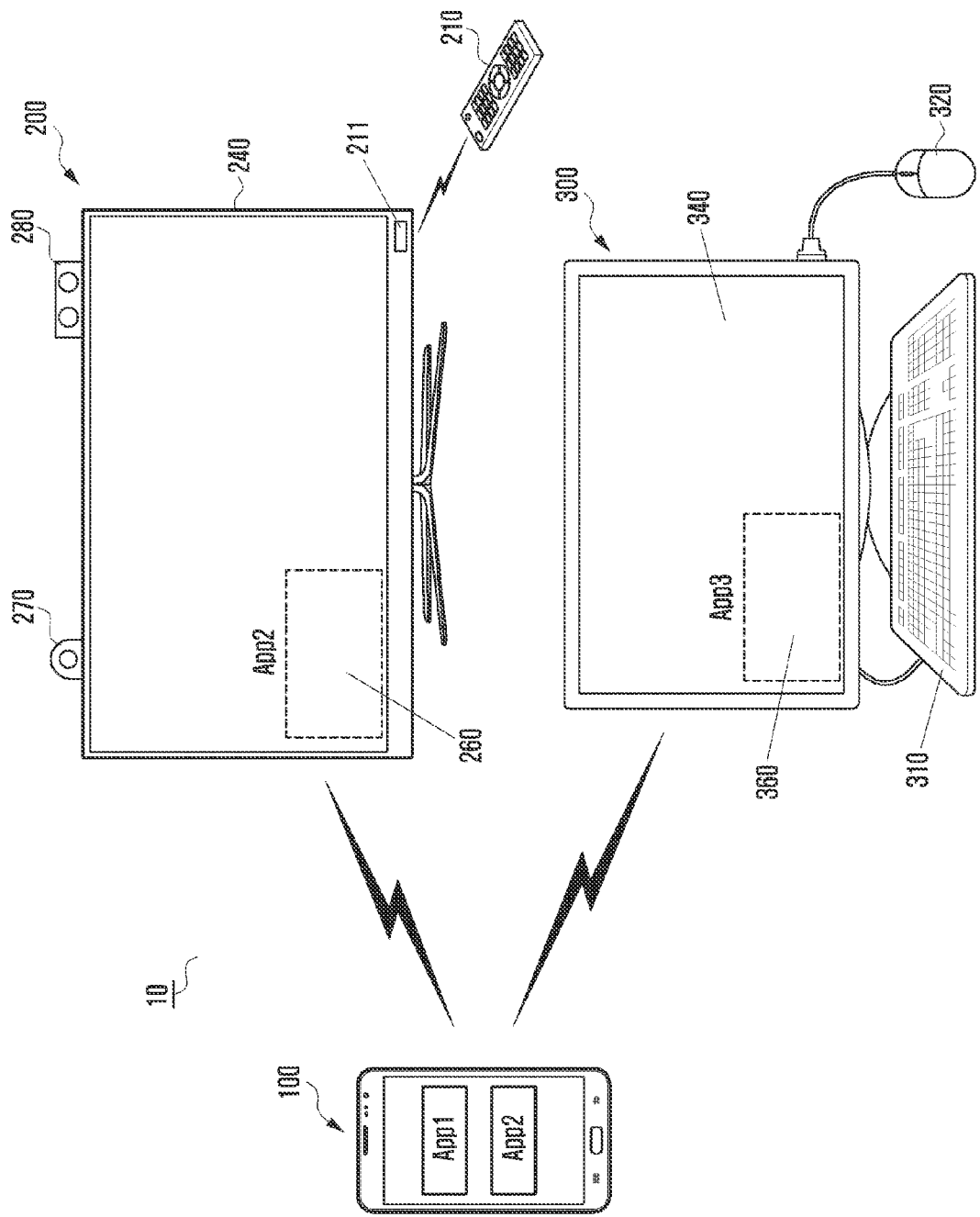
FIG. 7 illustrates a system supporting multi-input control according to a second embodiment of the present disclosure.
Figure 10A:
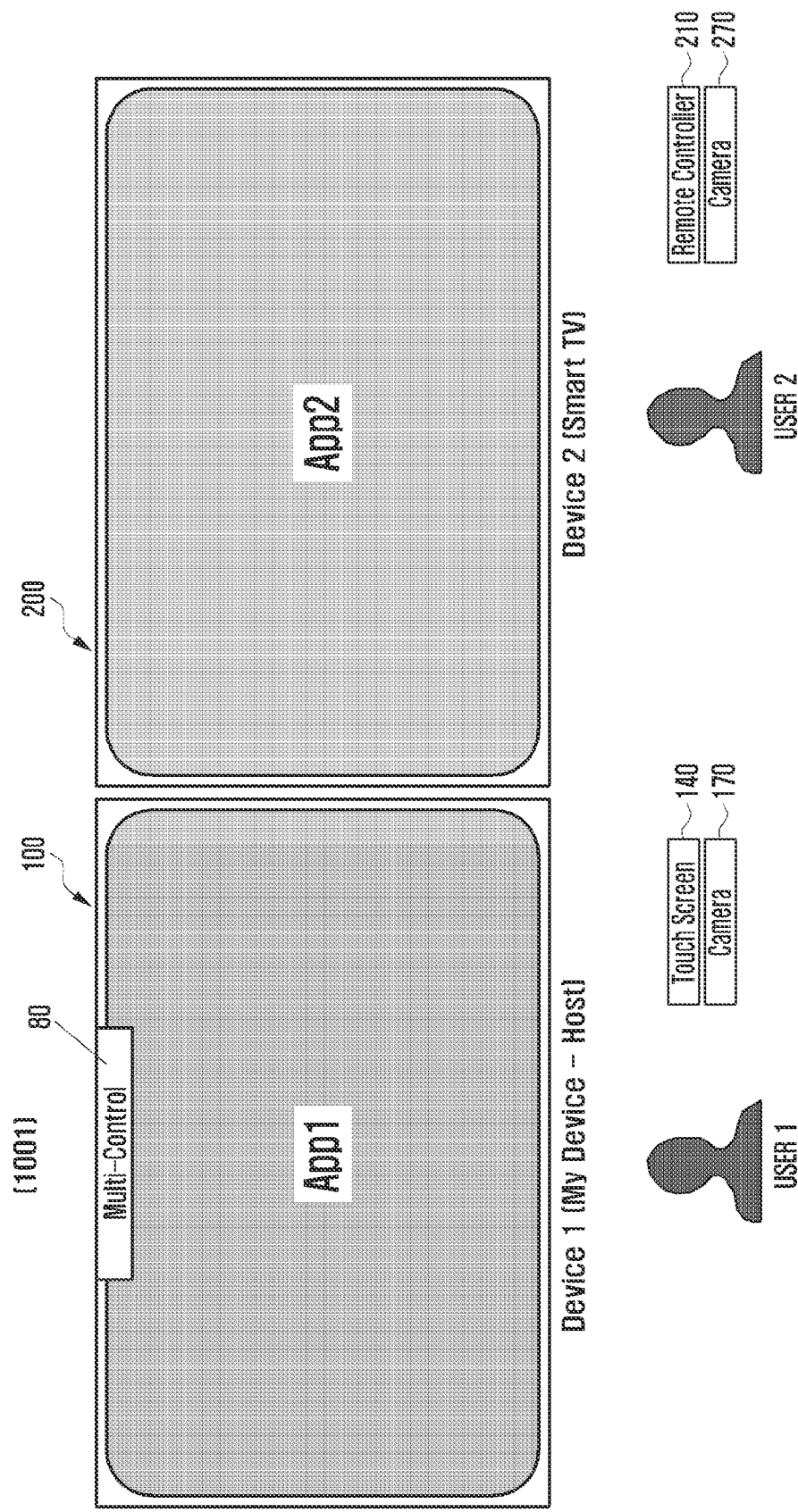
FIGS. 10A and 10B are another example of a screen interface supporting multi-input control according to the second embodiment of the present disclosure.
Figure 10B:
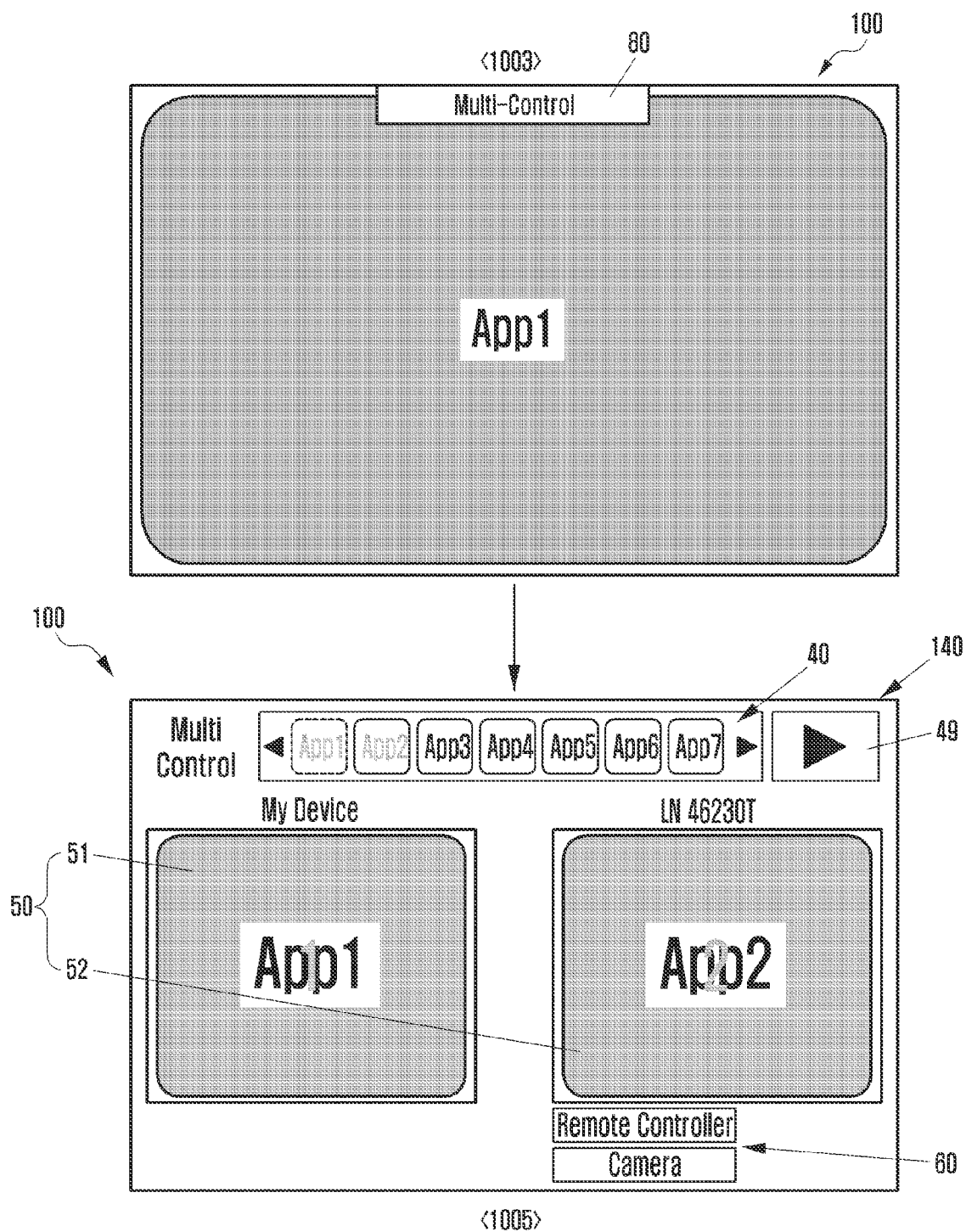

FIG. 7 illustrates a system supporting multi-input control according to a second embodiment of the present disclosure.

Referring to FIG. 7, the multi-input control system 10 may include a mobile terminal 100, a first external input/output device 200, and a second external input/output device 300. Here, the multi-input control system 10 may include the mobile terminal 100 and the first external input/output device 200 only or further include other external input/output devices according to capabilities of the mobile terminal 100.

In the multi-input control system 10 having the above configuration, the mobile terminal 100 may send functional screens of apps in execution to at least one of the first external input/output device 200 and the second external input/output device 300 connected to the connection interface 180 of the mobile terminal 100. In this process, the mobile terminal 100 of the multi-input control system 10 may provide input units to independently manipulate at least one activated app.

As an example, in a state wherein multiple apps are activated in the mobile terminal 100, it is assumed that the screen of a first app App1 is output in the mobile terminal 100, the screen of a second app App2 is output to the first external input/output device 200, and the screen of a third app App3 is output to the second external input/output device 300. Here, the mobile terminal 100 may allocate at least one input unit among input units of the mobile terminal 100 including the touch panel 141, pen touch panel 145, hardware keys 120, camera module 170, microphone MIC and motion sensor, for the first app App1 screen.

The mobile terminal 100 may assign an input unit, operable independently of that assigned to the first app App1, to the second app App2 whose output is to be sent to the first external input/output device 200. For example, when the touch panel 141 is assigned to the first app App1, the mobile terminal 100 may assign at least one of the pen touch panel 145, hardware keys 120, camera module 170, microphone MIC and motion sensor as an input means to the second app App2. The mobile terminal 100 may also assign separate regions of the touch panel 141 respectively to the first app App1 and the second app App2.

To manipulate the second app App2 whose output is to be sent to the first external input/output device 200, the mobile terminal 100 may allocate at least one of a first external input unit 210, a second external input unit 270 and a third external input unit 280 as an input means for the second external input/output device 300 according to user selection or default settings. When the user generates an input signal using an input unit assigned for manipulation of the second app App2, the input signal is applied to the second app App2, and updated second app App2 screen data may be output to the first external input/output device 200 correspondingly.

Here, the user may manipulate the input unit assigned to the second app App2 among the input units of the mobile terminal 100. The user may also manipulate at least one of the first to third external input units 210, 270, and 280 allocated to the first external input/output device 200 to generate an input signal to be applied to the second app App2. Here, an input signal generated by one of the first to third external input units 210, 270, and 280 is sent through the first external input/output device 200 to the mobile terminal 100.

When an input signal is received from the first external input/output device 200, the mobile terminal 100 may apply the input signal to the second app App2 and output resulting second app App2 screen data to the first external input/output device 200. Here, the mobile terminal 100 may establish a communication channel with the first external input/output device 200 through at least one of a wired connection and a wireless connection, and receive an input signal or send second app App2 screen data through the communication channel.

To this end, the first external input/output device 200 may include a first external input unit 210, a first device display unit 240, a first device control unit 260, a second external input unit 270, and a third external input unit 280. The first external input/output device 200 may further include a signal receiver unit 211 to support the first external input unit 210. Here, the second external input unit 270 may be a camera module. The third external input unit 280 may be a motion detection sensor. The first device control unit 260 may include a communication module to establish a communication channel with the mobile terminal 100 through at least one of a wired connection and a wireless connection. The first device control unit 260 may control an operation to receive second app screen data from the mobile terminal 100 and output the second app screen data on the first device display unit 240. During connection establishment with the mobile terminal 100, the first device control unit 260 may provide the mobile terminal 100 with information regarding the first to third external input units 210, 270, and 280 available for operating the first external input/output device 200.

When the first external input unit 210 is assigned to the second app App2, the first device control unit 260 may receive an input signal generated from the first external input unit 210 through the signal receiver unit 211. The first device control unit 260 may forward the received input signal to the mobile terminal 100, and receive second app App2 screen data as a result of application of the input signal from the mobile terminal 100 and output the second app App2 screen data on the first device display unit 240. When the first external input/output device 200 is connected with the mobile terminal 100, the first device control unit 260 may provide the mobile terminal 100 with information regarding the first to third external input units 210, 270, and 280. Upon reception of information regarding external input units equipped in the first external input/output device 200, the mobile terminal 100 may provide the received information as input unit selection information for the app whose output is to be sent to the first external input/output device 200 among multiple apps.

The second external input/output device 300 may include a fourth external input unit 310, a fifth external input unit 320, a second device display unit 340, and a second device control unit 360. The second device control unit 360 may include at least one wired or wireless communication module to establish a communication channel according to a connection request from the mobile terminal 100. When the second external input/output device 300 is connected with the mobile terminal 100, the second device control unit 360 may provide the mobile terminal 100 with information regarding input units equipped in the second external input/output device 300 such as the fourth and fifth external input units 310 and 320. When at least one of the fourth and fifth external input units 310 and 320 is assigned to the third app App3 in the mobile terminal 100, an input signal generated from the assigned external input unit is sent to the mobile terminal 100 under control of the second device control unit 360. When third app App3 screen data is received as a result of application of the input signal, the second device control unit 360 may output the third app App3 screen data on the second device display unit 340. Here, to manipulate the third app App3 whose output is to be sent to the second external input/output device 300, the mobile terminal 100 may assign an input unit, operable independently of other input units assigned to different apps, to the third app. For example, the mobile terminal 100 may assign the pen touch panel 145 or the hardware keys 120 to the third app. As described before, assignment of input units may be performed according to preset default information or user selection.

Meanwhile, the mobile terminal 100 may directly output only one of the first app App1 screen, the second app App2 screen, and the third app App3 screen. That is, the mobile terminal 100 may control the display unit 140 not to output the second app App2 screen and the third app App3 screen. The user may view the second app App2 screen output on the first device display unit 240 and use an input unit assigned to the second app App2 to generate an input signal to be applied to the second app App2. In addition, the user may view the third app App3 screen output on the second device display unit 340 and use an input unit assigned to the third app App3 to generate an input signal to be applied to the third app App3.

In the above description, the mobile terminal 100 is depicted as supporting the first app App1 screen, the second app App2 screen and the third app App3 screen. However, the present disclosure is not limited thereto. For example, the mobile terminal 100 may not execute the first app App1 whose output is to be sent to the display unit 140, and may execute only the second app App2 and the third app App3 whose outputs are to be sent respectively to the first external input/output device 200 and the second external input/output device 300. In this case, the mobile terminal 100 may output the second app App2 screen and the third app App3 screen respectively to the external device display units 240 and 340. When an input signal for the second app App2 or third app App3 is received, the mobile terminal 100 may output the received input signal to the display unit 140.

As described above, in the multi-input control system 10 supporting a multi-input control function according to the second embodiment of the present disclosure, the mobile terminal 100 may provide execution results of at least one app activated therein to an external input/output device and may independently assign an input unit to be used to manipulate the app according to default or user settings. Particularly, in the multi-input control system 10 supporting a multi-input control function according to the second embodiment of the present disclosure, the mobile terminal 100 is allowed to independently assign not only input units but also external input units connected through the connection interface and an external input/output device as input means to one or more apps executed in the mobile terminal 100.

FIG. 8 is a flowchart of a procedure performed by the mobile terminal 100 in the multi-input control method according to the second embodiment of the present disclosure.

Referring to FIG. 8, in the procedure executed by the mobile terminal 100 for the multi-input control method according to the second embodiment of the present disclosure, at operation 801, the mobile terminal 100 waits for functional operation. Here, the control unit 160 may distribute power from a power source, and output a standby screen, at least one icon or at least one menu item on the display unit 140 according to preset information.

Thereafter, upon generation of an event, at operation 803, the mobile terminal 100 checks whether the event is a request for the multi-input control mode. If the event is not a request for the multi-input control mode, the mobile terminal 100 proceeds to operation 805 at which the mobile terminal 100 performs a function according to properties of the event. For example, the mobile terminal 100 may activate at least one app according to a user request or preset information and output corresponding app screens on the display unit 140. Here, the mobile terminal 100 may assign an input unit to an app associated with the top layer screen on the display unit 140. The mobile terminal 100 may then apply an input signal generated from the assigned input unit to the app associated with the top layer screen.

If the event is a request for the multi-input control mode at operation 803, the mobile terminal 100 proceeds to operation 807 at which the mobile terminal 100 checks whether an external device is connected. If an external device is not connected, the mobile terminal 100 proceeds to operation 809 at which the mobile terminal 100 supports multi-input control using input units equipped therein. For example, when multiple apps are activated, the mobile terminal 100 may assign input units to the apps so that the input units are independently operable. Here, the mobile terminal 100 may perform area demarcation on the touch panel 141 or pen touch panel 145 and assign different areas thereof to the apps. To perform multi-input control for the apps, the mobile terminal 100 may generate information on mappings between the demarcated areas and the apps, and apply an input signal generated in one area only to the app mapped with the area.

If an external device is connected at operation 807, the mobile terminal 100 proceeds to operation 811 at which the mobile terminal 100 supports multi-input control on the basis of external input units and input units equipped in the mobile terminal 100. To this end, the mobile terminal 100 may obtain input means IDs of external input units connected to the connection interface 180, and create and maintain an input unit list composed of the input means IDs. The mobile terminal 100 may create and maintain input unit mapping information by associating at least one input unit, selected from among the external input units and input units equipped in the mobile terminal 100 according to user selection or control of the control unit 160, with a specific app. That is, the input unit mapping information is composed of mappings between input means IDs and app IDs. Here, more than one input means ID may be mapped with one app ID.

At operation 813, the mobile terminal 100 checks whether an input signal is received. If an input signal is received, the mobile terminal 100 proceeds to operation 815 at which the mobile terminal 100 performs operation control and information output according to the input unit mapping information. In the multi-input control system 10, each input unit may send an input signal having a given input means ID to the control unit 160 of the mobile terminal 100. In particular, an input unit capable of supporting area demarcation such as the touch panel 141 or pen touch panel 145 may generate an input signal having a given area ID. When an input signal is received, the control unit 160 may examine the input means ID to identify the mapped app ID and apply the input signal to the corresponding app. Then, the mobile terminal 100 may output resulting app screen data to the display unit 140 or to the connected external input/output device.

If an input signal is not received at operation 813, the mobile terminal 100 proceeds to operation 817 at which the mobile terminal 100 checks whether an event for exiting the multi-input control mode is generated. If an event for exiting the multi-input control mode is not generated, the mobile terminal 100 returns to operation 811 and repeats the above procedure. During repetition from operation 811, the mobile terminal 100 may change assignment of input units for a specific app.

If an event for exiting the multi-input control mode is generated at operation 817, the mobile terminal 100 proceeds to operation 819 at which the mobile terminal 100 checks whether a termination event is generated. If a termination event is not generated, the mobile terminal 100 returns to operation 803 and continues processing.

As described above, the multi-input control function according to the second embodiment of the present disclosure allows not only input units equipped in the mobile terminal 100 but also external input units connectable to the mobile terminal 100 through the connection interface 180 to be assigned as independent input means to individual apps running in the mobile terminal 100. Hence, in the case of content playback on or through the mobile terminal 100, the present disclosure enables the user to view content on a large screen of an external input/output device and to easily control apps running on the mobile terminal 100.

FIGS. 9A to 10B are examples of a screen interface of the mobile terminal 100 supporting multi-input control according to the second embodiment of the present disclosure. In the following description on the multi-input control function according to the second embodiment of the present disclosure, it is assumed that the mobile terminal 100 is connected with one external input/output device. However, the present disclosure is not limited thereto. When more than one external input/output device is connected with the mobile terminal 100, the number of app usage areas on the mobile terminal 100 may be increased accordingly.

Referring to FIGS. 9A to 10B, the mobile terminal 100 may output a multi-input control screen on the display unit 140 as indicated by reference 901. The multi-input control screen may include an app selection area 40, an app usage area 50, and an input unit mapping area 60.

The app selection area 40 is used to select at least one of many apps. As shown, multiple apps are presented as icons in the app selection area 40. The app selection area 40 may support a scrolling function to browse currently hidden apps. A virtual full-screen key 49 placed at a portion of the app selection area 40 enables a selected app usage area to be output in a full screen format on the display unit 140.

The app usage area 50 may include a first app usage area 51 and a second app usage area 52. The first app usage area 51 may be used to output an app screen of an app whose output is to be sent only to the display unit 140. The app associated with the first app usage area 51 may utilize input units equipped in the mobile terminal 100. Screen output location information "My Device" is output at a portion of the first app usage area 51. Here, "My Device" indicates that the app associated with the first app usage area 51 outputs screen data only on the display unit 140 of the mobile terminal 100.

The second app usage area 52 is used to output an app screen of an app different from the app associated with the first app usage area 51. In particular, the app screen output on the second app usage area 52 may be sent to an external input/output device connected through the connection interface 180. To this end, external device identification information, for example, "LN 46230T" may be output at a portion of the second app usage area 52. In other words, app screen data output on the second app usage area 52 is also output on the external input/output device with identification information "LN 46230T". In addition, the input unit mapping area 60 is output at a portion of the second app usage area 52.

As shown, "Remote Controller" and "Camera" are listed in the input unit mapping area 60. Here, "Remote Controller" and "Camera" indicates input units equipped in an external input/output device, which provide input signals through the external input/output device. Alternatively, "Remote Controller" may indicate an input unit equipped in an external input/output device, and "Camera" may indicate the camera module 170 equipped in the mobile terminal 100. That is, the app associated with the second app usage area 52 may receive an input signal from a remote controller equipped in the external input/output device or from the camera module 170 of the mobile terminal 100. If "Camera" indicates a camera module equipped in the external input/output device, the app associated with the second app usage area 52 may receive an input signal only through the external input/output device. When an input unit equipped in the mobile terminal 100 by default is assigned to the app associated with first app usage area 51, input unit mapping information may be not output separately.

In a state indicated by reference 901, the user may select an app icon (App1) from among many app icons arranged in the app selection area 40 and drag the same to the first app usage area 51. Then, the mobile terminal 100 may regard dragging of the app icon to the first app usage area 51 as an input signal for activating the corresponding app, activate the first app (App1), and output the screen of the first app in the first app usage area 51 as indicated by reference 903.

As indicated by reference 905, when the user selects an app icon (App2) arranged in the app selection area 40 and drags the same to the second app usage area 52, the mobile terminal 100 may activate the corresponding second app (App2), and output the screen of the second app in the second app usage area 52 accordingly as indicated by reference 907.

In a state indicated by reference 907, when the virtual full-screen key 49 is pressed, the mobile terminal 100 may output only the screen of the first app (App1) on the display unit 140 as indicated by reference 1001. For switching to the multi-input control screen, the mobile terminal 100 may output a virtual control key 80 at a portion of the screen. At the same time, the mobile terminal 100 may output screen data of the second app (App2) to the first external input/output device 200. Hence, a first user (User1) may manipulate the first app (App1) on the mobile terminal 100, and a second user (User2) may view the second app screen on the first external input/output device 200 and manipulate the second app (App2) running on the mobile terminal 100 through the first external input/output device 200.

In a state indicated by reference 1001, to support manipulation of the second app (App2), the mobile terminal 100 may execute the second app (App2) in the background and send corresponding second app screen data to the first external input/output device 200 through the connection interface 180. The first external input/output device 200 may receive second app screen data from the mobile terminal 100 and output the second app screen data on the first device display unit 240.

When an input signal is generated from the first external input unit 210 such as a remote controller, the first external input/output device 200 may send the input signal to the mobile terminal 100. To this end, the mobile terminal 100 and the first external input/output device 200 may establish a communication channel to transfer second app screen data and input signals. When an input signal is received from the first external input/output device 200, the mobile terminal 100 may examine the input means ID of the input signal and apply the input signal to the second app (App2). Thereafter, the mobile terminal 100 may send second app screen data carrying results of input signal application to the first external input/output device 200. Here, the mobile terminal 100 may process tasks related to the second app (App2), such as signal application and screen data transfer, in the background. The mobile terminal 100 may output a text or sound notification indicating reception of an input signal from the first external input/output device 200.

Meanwhile, when an input signal for selecting the virtual control key 80 is generated in a state indicated by reference 1003, the mobile terminal 100 may output the multi-input control screen as indicated by reference 1005. That is, during operation of the first app (App1), when the first user (User1) or the second user (User2) generates an input signal by selecting the virtual control key 80, the mobile terminal 100 may output a screen containing the app selection area 40 and the first app usage area 51 and second app usage area 52 on the display unit 140.

Figure 11:
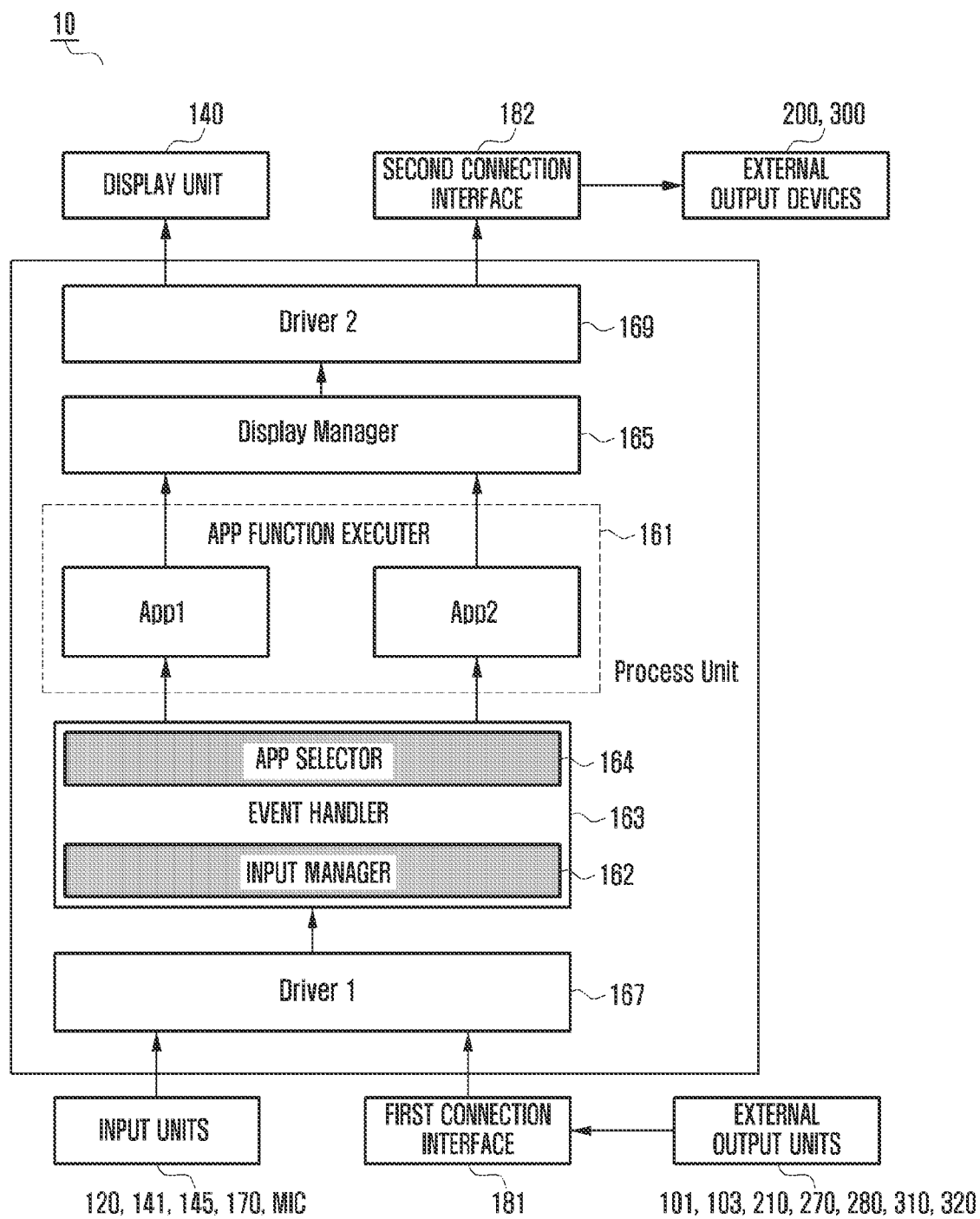
FIG. 11 illustrates functional modules supporting multi-input control according to the second embodiment of the present disclosure.

FIG. 11 illustrates functional modules supporting a multi-input control system according to an embodiment of the present disclosure.

Referring to FIG. 11, in the multi-input control system 10 of the present disclosure, the mobile terminal 100 may include at least one of input units 120, 141, 145, 170, and MIC, and may include the first connection interface 181 to support connection of at least one of external input units 101, 103, 210, 270, 280, 310, and 320 (described before in connection with different embodiments). The first driver 167 is configured to support connection of the input units 120, 141, 145, 170, and MIC, and connection of the external input units 101, 103, 210, 270, 280, 310, and 320, and to deliver input signals generated from the input units to the event handler 163. The event handler 163, including the input manager 162 and the app selector 164, may receive an input signal from one of the input units 120, 141, 145, 170, and MIC, or from one of the external input units 101, 103, 210, 270, 280, 310, and 320, and forward the input signal to a corresponding one of multiple apps.

The app function executer 161 is configured to receive an input signal from the event handler 163 and apply the received signal to the corresponding app for execution. In the drawing, a first app (App1) and second app (App2) are activated. However, the present disclosure is not limited thereto. That is, the app function executer 161 may activate more than two apps. When the number of apps activated in the app function executer 161 is increased, the event handler 163 controls the individual apps to independently receive input signals for execution. That is, when an app is newly activated, the event handler 163 may select an input unit not yet assigned to an existing app from the input units 120, 141, 145, 170, and MIC, and the external input units 101, 103, 210, 270, 280, 310, and 320, and assign the selected input unit to the newly activated app. Here, the event handler 163 may assign an input unit already assigned to an existing app to the newly activated app according to a user request. To this end, the event handler 163 may output a screen for selecting input units on the display unit 140 of the mobile terminal 100. The event handler 163 may assign input units to individual apps according to a preset schedule and output guide information indicating input unit assignment for the user. For example, the event handler 163 may sequentially assign input units to individual apps in order of activation. The event handler 163 may also assign independent areas of at least one of the touch panel 141 and the pen touch panel 145 to apps whose output is to be sent to the display unit 140 among many activated apps.

The first app (App1) and second app (App2) are executed according to input signals delivered by the event handler 163, and execution result data thereof is sent to the display manager 165. The display manager 165 may send the execution result data to the display unit 140 through the second driver 169 or to at least one of the external output devices 200 and 300 described before through the second driver 169 and second connection interface 182. Here, the external output devices 200 and 300 may correspond to the first and second external input/output devices described in connection with FIG. 7.

In the above description, the mobile terminal is depicted as being equipped with built-in input units. However, the present disclosure is not limited thereto. That is, the mobile terminal may include a connection interface to which external input units are connectable, without built-in input units. Here, the connection interface may support connection of one or more external input units for generating input signals to be applied to multiple activated apps. In this case, when multiple apps are to be activated, the control unit of the mobile terminal may assign the external input units to the individual apps according to an event or preset information so that the external input units are independently operable.

Here, the external input units may include at least one of a touch panel, a pen and pen touch panel, a keyboard, a camera module, a microphone, and a motion sensor, which are connectable to the connection interface. In this environment, the control unit may assign different areas of the touch panel connected through the connection interface to multiple apps. The control unit may also assign different areas of the pen touch panel connected through the connection interface to multiple apps. The control unit may also assign different keys of the keyboard to multiple apps.

When an input signal is received from one the external input units, the control unit of the mobile terminal may identify the app to which the external input unit is assigned and apply the input signal to the identified app. The mobile terminal may further include a display unit to output app usage areas corresponding to multiple activated apps. The display unit may output a screen interface for the external input units. For example, the display unit may output at least one of an app selection area, an app usage area, and an input unit selection area. The display unit may also output a screen that includes an app selection area, app usage areas to output app screens of selected apps, and an input unit mapping area to output information regarding external input units mapped with the apps.

The control unit may demarcate areas on at least one of the touch panel and pen touch panel connected through the connection interface in accordance with the app usage areas, and assign the demarcated areas on the touch panel and pen touch panel as input means to the individual apps. Upon generation of an event, the display unit equipped in the mobile terminal may output a virtual input window in at least one of the app usage areas.

In addition, the mobile terminal may include a communication unit to operate multiple apps, and connect to an external server device supporting execution of multiple apps through the communication unit. Here, the mobile terminal may use the external input units described above to manipulate server-based apps running on the external server device. The mobile terminal may also connect to an external electronic device supporting execution of multiple apps through the connection interface. Here, the mobile terminal may assign the external input units to multiple apps running on the external electronic device and support manipulation of the apps.

As described above, the multi-input control function of the present disclosure enables the mobile terminal 100 to operate input units independently on a per-app basis. Hence, the user may manipulate the input units to provide an input signal to a desired app without switching between apps. In addition, the multi-input control function makes it possible to assign at least one input unit to one of multiple apps running on a connected external device, enhancing user interface expandability.

Meanwhile, the mobile terminal 100 may further include various components according to design. For example, when the mobile terminal 100 is a communication terminal, the mobile terminal 100 may further include a local area communication module for local area communication, a data communication interface based on wired and wireless communication, an Internet communication module for Internet access and communication, and a digital broadcast reception module for receiving and playing digital broadcasts. Although possible variations according to the trend of digital convergence are too numerous to enumerate, it should be apparent to those skilled in the art that the mobile terminal 100 may further include a unit comparable to the above-described units, and various units of the mobile terminal 100 may be removed or replaced with other units.

The mobile terminal 100 of the present disclosure may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player such as a digital audio player, a portable game console, a smartphone, a laptop computer, or a handheld computer.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for multi-input control in an electronic device, the method comprising:
   receiving an activation request for multiple applications (apps);
   identifying one or more input units to operate the multiple apps; and
   assigning the input units to the multiple apps according to occurrence of an event or preset information so that the input units are operable to operate the apps in an independent manner.

2. The method of claim 1, wherein the assigning of the input units comprises at least one of:
   assigning different touch panel areas to each app;
   assigning different pen touch panel areas to each app; and
   assigning different hardware keys to each app.

3. The method of claim 1, wherein the assigning of the input units comprises assigning input units including at least one of a touch panel, a pen touch panel, hardware keys, a camera module, a microphone, and a motion sensor to each app without input unit duplication.

4. The method of claim 1, further comprising:
   receiving an input signal generated from one of the input units;
   identifying an app to which the input unit is assigned; and
   applying the input signal to the identified app.

5. The method of claim 1, wherein the identifying of the input units comprises:
   connecting one or more external input units through a connection interface of the electronic device; and
   assigning the connected external input units as input means to at least one of the multiple apps.

6. The method of claim 5, wherein the assigning of the input units comprises assigning one or more input units selected from among the input units of the electronic device and the external input units to the multiple apps so that the assigned input units are operable to operate the apps in an independent manner.

7. The method of claim 1, further comprising outputting a screen comprising one or more app usage areas each corresponding to one of the multiple apps.

8. The method of claim 7, wherein the outputting of the screen comprises at least one of:
   outputting an app selection area to select one of the apps;
   outputting an app usage area to output screen data of the selected app; and
   outputting an input unit selection area to select an input unit allocable to the selected app.

9. The method of claim 7, wherein the outputting of the screen comprises:
   outputting an app selection area to select at least one of the apps;
   outputting an app usage area to output screen data of each selected app; and
   outputting an input unit mapping area to output information on at least one input unit assigned to the selected app.

10. The method of claim 9, wherein the assigning of the input units comprises:
    demarcating areas on at least one of a touch panel and a pen touch panel according to screen areas of the apps; and
    assigning the demarcated areas on the touch panel and the pen touch panel as input means to the apps.

11. The method of claim 10, further comprising outputting a virtual input window in at least one of the app screen areas according to occurrence of an event.

12. The method of claim 9, further comprising:
    connecting an external input/output device through a connection interface of the electronic device;
    outputting screen data of an app selected from the multiple apps to the external input/output device; and
    displaying a screen of another selected app in a full screen format on the electronic device.

13. The method of claim 12, further comprising outputting a virtual control key to restore a screen comprising app usage areas for the multiple apps.

14. The method of claim 1, further comprising:
    connecting an external input/output device through a connection interface of the electronic device;
    sending, by the external input/output device, information on external input units equipped in the external input/output device to the electronic device; and
    displaying, by the electronic device, the received information on external input units as input unit selection information for one of the apps to be manipulated with an external input unit.

15. The method of claim 1, wherein the assigning of the input units further comprises:
- connecting an external input/output device through a connection interface of the electronic device;
- sending, by the external input/output device, information on external input units equipped in the external input/output device to the electronic device; and
- assigning the external input units as input means to an app whose output is to be sent to the external input/output device among the multiple apps.

16. The method of claim 15, further comprising:
- sending, by the external input/output device, an input signal generated from one of the external input units to the electronic device;
- applying, by the electronic device, the received input signal to the app whose output is to be sent to the external input/output device; and
- sending, by the electronic device, app screen data including results of input signal application to the external input/output device.

17. An electronic device supporting multi-input control, the electronic device comprising:
- one or more input units configured to generate input signals for operating multiple applications (apps); and
- a control unit configured to perform, upon reception of an activation request for the apps, a process of assigning the input units to the multiple apps according to occurrence of an event or preset information so that the input units are operable to operate the apps in an independent manner.

18. The electronic device of claim 17, wherein the input units comprise at least one of a touch panel, a pen touch panel, hardware keys, a camera module, a microphone, and a motion sensor.

19. The electronic device of claim 18, wherein the control unit is configured to assign different touch panel areas to each app.

20. The electronic device of claim 18, wherein the control unit is configured to assign different pen touch panel areas to each app.

21. The electronic device of claim 18, wherein the control unit is configured to assign different hardware keys to each app.

22. The electronic device of claim 17, wherein, when an input signal is received from one of the input units, the control unit is configured to identify an app to which the input unit is assigned and to apply the input signal to the identified app.

23. The electronic device of claim 17, further comprising a connection interface to which one or more external input units are connectable.

24. The electronic device of claim 23, wherein the control unit is configured to assign one or more input units selected from among the input units and the external input units to the multiple apps so that the assigned input units are operable to operate the apps in an independent manner.

25. The electronic device of claim 17, further comprising a display unit configured to output a screen containing one or more app usage areas each corresponding to an app.

26. The electronic device of claim 25, wherein the display unit is configured to output a screen comprising at least one of an app selection area usable for selecting one of the apps, an app usage area usable for outputting screen data of the selected app, and an input unit selection area usable for selecting an input unit allocable to the selected app.

27. The electronic device of claim 25, wherein the display unit is configured to output a screen that comprises an app selection area usable for selecting one of the apps, an app usage area usable for outputting screen data of the selected app, and an input unit mapping area usable for presenting information on at least one input unit assigned to the apps.

28. The electronic device of claim 27, wherein the control unit is configured to demarcate areas on at least one of a touch panel and a pen touch panel according to screen areas of the apps and to assign the demarcated areas on the touch panel and the pen touch panel as input means to the apps.

29. The electronic device of claim 28, wherein the display unit is configured to output a virtual input window in at least one of the app screen areas according to occurrence of an event.

30. A electronic device supporting multi-input control, the electronic device comprising:
- a connection interface to which one or more external input units generating input signals for operating multiple applications (apps) are connectable; and
- a control unit configured to perform, upon reception of an activation request for the apps, a process of assigning the external input units to the multiple apps according to occurrence of an event or preset information so that the external input units are operable to operate the apps in an independent manner.

31. The electronic device of claim 30, wherein the external input units comprise at least one of a touch panel, a pen and a pen touch panel, a keyboard, a camera module, a microphone, and a motion sensor.

32. The electronic device of claim 31, wherein the control unit is configured to assign different areas of the touch panel connected through the connection interface to each app.

33. The electronic device of claim 31, wherein the control unit is configured to assign different areas of the pen touch panel connected through the connection interface to each app.

34. The electronic device of claim 31, wherein the control unit is configured to assign different keys of a keyboard to each app.

35. The electronic device of claim 30, wherein, when an input signal is received from one of the external input units, the control unit is configured to identify an app to which the external input unit is assigned and to apply the input signal to the identified app.

36. The electronic device of claim 30, further comprising a display unit configured to output a screen comprising app one or more usage areas each corresponding to an app.

37. The electronic device of claim 36, wherein the display unit is configured to output a screen comprising at least one of an app selection area usable for selecting one of the apps, an app usage area usable for outputting screen data of the selected app, and an input unit selection area usable for selecting an external input unit allocable to the selected app.

38. The electronic device of claim 36, wherein the display unit is configured to output a screen that comprises an app selection area usable for selecting one of the apps, an app usage area usable for outputting screen data of the selected app, and an input unit mapping area usable for presenting information on at least one external input unit assigned to the apps.

39. The electronic device of claim 38, wherein the control unit is configured to demarcate areas on at least one of a touch panel and a pen touch panel connected through the connection interface according to screen areas of the apps and assigns the demarcated areas on the touch panel and the pen touch panel as input means to the apps.

40. The electronic device of claim 39, wherein the display unit is configured to output a virtual input window in at least one of the app screen areas according to occurrence of an event.

41. A multi-input control system comprising:
an electronic device capable of supporting execution of multiple applications (apps) and comprising one or more input units configured to operate the multiple apps; and
at least one external input/output device connected with the electronic device through a connection interface of the electronic device and configured to receive an input signal from one or more external input units,
wherein the electronic device is configured to assign one or more input units selected from among the input units thereof and the external input units to the multiple apps so that the assigned input units are operable to operate the apps in an independent manner, or to output an input unit list to enable such input unit assignment.

* * * * *